United States Patent
Laller

(10) Patent No.: US 11,140,116 B2
(45) Date of Patent: Oct. 5, 2021

(54) METHOD FOR PROVIDING NOTIFICATION TO UNCOVER EXECUTION SCREEN AND ELECTRONIC APPARATUS FOR PERFORMING SAME

(71) Applicant: Samsung Electronics Co., Ltd., Gyeonggi-do (KR)

(72) Inventor: Nitesh Laller, Noida (IN)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 15/885,209

(22) Filed: Jan. 31, 2018

(65) Prior Publication Data

US 2018/0219824 A1 Aug. 2, 2018

(30) Foreign Application Priority Data

Jan. 31, 2017 (IN) .............................. 201711003577

(51) Int. Cl.
| | |
|---|---|
| *G06F 3/16* | (2006.01) |
| *H04L 12/58* | (2006.01) |
| *G06F 3/0488* | (2013.01) |
| *G02B 27/01* | (2006.01) |
| *G06F 3/0484* | (2013.01) |

(Continued)

(52) U.S. Cl.
CPC ............ *H04L 51/24* (2013.01); *G02B 27/017* (2013.01); *G06F 3/0488* (2013.01); *G06F 3/04842* (2013.01); *G06F 3/165* (2013.01); *G06F 3/167* (2013.01); *G06F 9/445* (2013.01); *G06F 9/451* (2018.02); *G02B 2027/0187* (2013.01)

(58) Field of Classification Search
CPC ......... H04L 51/24; G06F 3/165; G06F 9/542; G06F 3/0481; G06F 3/0488; G06F 3/04842; G02B 27/017; G06T 19/006; G06T 2200/04; G09G 2370/16
See application file for complete search history.

(56) References Cited

U.S. PATENT DOCUMENTS

| | | |
|---|---|---|
| 8,805,690 B1 | 8/2014 | Lebeau et al. |
| 9,037,455 B1 | 5/2015 | Faaborg et al. |
| 2006/0090169 A1 | 4/2006 | Daniels et al. |

(Continued)

FOREIGN PATENT DOCUMENTS

EP 2894560 7/2015

OTHER PUBLICATIONS

Smart Mehtod of Managing Notification on Mobile Device (IPCOM000245581D, publihsed on Mar. 21, 2016).*

(Continued)

*Primary Examiner* — Rinna Yi
(74) *Attorney, Agent, or Firm* — The Farrell Law Firm, P.C.

(57) ABSTRACT

Provided is an electronic device which includes a display; and a processor configured to control the display to display an execution screen of an application from a plurality of applications for which different priorities are set, control the display to display a notification message on the execution screen, in response to a notification of an application having a priority higher than a priority of the currently-executed application occurring, and provide the notification not to cover the execution screen, in response to a notification of an application having a priority lower than the priority of the currently-executed application occurring.

14 Claims, 15 Drawing Sheets

(51) Int. Cl.
*G06F 9/445* (2018.01)
*G06F 9/451* (2018.01)

(56) References Cited

U.S. PATENT DOCUMENTS

| | | | |
|---|---|---|---|
| 2008/0096531 A1 | 4/2008 | McQuaide et al. | |
| 2009/0238386 A1 | 9/2009 | Usher et al. | |
| 2012/0029672 A1 | 2/2012 | Hamilton et al. | |
| 2012/0150853 A1* | 6/2012 | Tang | G06F 16/24575 707/728 |
| 2014/0181843 A1 | 6/2014 | Yang | |
| 2014/0344375 A1* | 11/2014 | Hauser | H04L 51/04 709/206 |
| 2015/0143406 A1* | 5/2015 | Cho | H04N 21/4131 725/32 |
| 2016/0014257 A1 | 1/2016 | He et al. | |
| 2016/0095083 A1 | 3/2016 | Park | |
| 2016/0173683 A1 | 6/2016 | Abreu et al. | |
| 2016/0334879 A1* | 11/2016 | Hirano | G06F 3/0426 |
| 2016/0335801 A1 | 11/2016 | Yoon et al. | |
| 2016/0342285 A1 | 11/2016 | Wang | |
| 2016/0342327 A1* | 11/2016 | Chi | H04M 1/05 |
| 2017/0102855 A1* | 4/2017 | Kwon | G06F 3/04847 |
| 2018/0107930 A1* | 4/2018 | Aggarwal | G06N 5/02 |
| 2018/0255015 A1* | 9/2018 | Ahn | G06F 3/04883 |

OTHER PUBLICATIONS

International Search Report dated Jun. 18, 2018 issued in counterpart application No. PCT/KR2018/001352, 10 pages.
European Search Report dated Nov. 8, 2019 issued in counterpart application No. 18747332.7-1216, 7 pages.

* cited by examiner

METHOD FOR PROVIDING NOTIFICATION TO UNCOVER EXECUTION SCREEN AND ELECTRONIC APPARATUS FOR PERFORMING SAME

PRIORITY

This application is based on and claims priority under 35 U.S.C. § 119 to Indian Patent Application No. 201711003577, filed on Jan. 31, 2017, in the Indian Intellectual Property Office, the disclosure of which is incorporated by reference herein in its entirety.

BACKGROUND

1. Field

The present disclosure relates generally to the area of handling a notification while executing an application on an electronic device. In particular, the present disclosure relates to a method and a system which can provide notifications to a user without interrupting the main application being run on the electronic device.

2. Description of Related Art

Currently, most people are using electronic entertainment devices like mobile phones, tablets, and other portable multimedia devices. These electronic devices are equipped with a notification manager which is responsible for delivering various types of notifications from different applications such as a call notification, a message notification, a social media message notification, an event notification, an alarm notification, etc. All notifications are intended to provide the user information about activity happening on various applications or services running on the electronic device.

The traditional way for delivering a notification on an electronic devices is to display a pop-up message on a screen along with a sound. If, however, the user is using an application and a call, a message, or another notification arrives, the display screen immediately shows the notification popup on top of the current running application and plays a sound.

As soon as the notification is displayed on the display of the electronic device, the user's attention is taken to the notification and the user may respond by either rejecting or accepting that notification. The user's response could be in any form, such as, swiping a finger on the screen, tapping on the screen with a finger, an air gesture, pressing of a button, etc.

While in some cases, the user may desire to receive the notification, in other cases, the user may not desire to receive the notification. Also, when the user desires to receive the notification, the user may want the notification to be provided in a subtle manner or, in other words, without creating too much hindrance. The user may wish the notification to be provided without interrupting an application being executed. The user may wish the notification be provided in a non-distractive manner compared to the application being executed.

There still exists a need to provide a notification handling method and a device for handling notifications while executing an application on an electronic device.

SUMMARY

According to an embodiment, an electronic device includes a display; and a processor configured to control the display to display an execution screen of an application from a plurality of applications for which different priorities are set, control the display to display a notification message on the execution screen, in response to a notification of an application having a priority higher than a priority of the currently-executed application occurring, and provide the notification not to cover the execution screen, in response to a notification of an application having a priority lower than the priority of the currently-executed application occurring.

The electronic device may further include a speaker, wherein the processor is further configured to control the speaker, and output a notification sound without displaying the notification message on the execution screen, in response to a notification of the application having the priority lower than the currently-executed application occurring.

The notification sound may include a speech sound message which speaks a text included in the notification.

The output volume of the notification sound may be set differently according to priority.

The electronic device may further include a microphone, wherein the processor is further configured to recognize a user voice as an input with respect to the application which provides the notification, in response to the user voice corresponding to the notification sound being input through the microphone.

The processor may further control the display to display the notification message after termination of the currently-executed application, in response to the notification of an application having a priority lower than the currently-executed application occurring.

The processor may further set priorities of each notification type differently, in response to the notification of a specific application being a plurality of types.

The processor may further set a priority of the notification to a lowest or highest priority, in response to a specific word being included in the notification of the specific application.

The electronic device may be a head mounted display (HMD), and the execution screen of the application may include an augmented reality (AR) image or a virtual reality (VR) image.

The processor may display the notification message or provide the notification when the application is executed in an AR mode or a VR mode.

According to an embodiment, a method of providing a notification of an electronic device includes displaying an execution screen, in response to an application from among a plurality of applications to which different priorities are set being executed; displaying a notification message on the execution screen, in response to a notification of an application having a priority higher than a priority of the currently-executed application occurring, and providing the notification not to cover the execution screen, in response to a notification of an application having a priority lower than a priority of the currently-executed application occurring.

The providing the notification may include outputting a notification sound through a speaker of the electronic device without displaying the notification message on the execution screen, in response to the notification of the application having the priority lower than the currently-executed application occurring.

The notification sound may include a speech sound message which speaks a text included in the notification.

The output volume of the notification sound may be set differently according to priority.

The providing the notification may include displaying the notification message after the currently-executed application is terminated, in response to the notification of an application having the lower priority than the currently-executed application occurring.

The method may further include setting priorities of each notification type differently, in response to the notification of a specific application being a plurality of types.

The method may further include setting the priority of the notification to a lowest or highest priority, in response to a specific word being included in the notification of the specific application.

The displaying the notification message or the providing the notification may be performed when the application is executed in an AR mode or a VR mode.

According to an embodiment of the present disclosure, a method for handling a notification while executing an application on an electronic device if provided. To this end, the method determines a type of application being executed and a priority level associated with the notification. The method generates a modified notification by modifying at least one parameter pertaining to output of the notification based on the type of application and the priority level associated with the notification. The method further provides the modified notification to an output unit associated with the electronic device.

According to an embodiment of the present disclosure, a notification handling module for handling a notification while executing an application on an electronic device is provided. The notification handling module includes an application determining module adapted to determine a type of application being executed on the electronic device. The notification handling module further includes a notification priority determining module adapted to determine a priority level associated with the notification. The notification handling module furthermore includes a notification delivery module adapted to generate a modified notification by modifying at least one parameter pertaining to output of the notification based on the type of application and the priority level associated with the notification. The notification delivery module is further adapted to provide the modified notification to an output unit associated with the electronic device.

According to an embodiment of the present disclosure, an electronic device is provided and includes a display configured to display an execution screen of an application from a plurality of applications for which different priorities are set; and a processor configured to execute the application, display a notification message on the execution screen, in response to a notification of an application having a priority higher than a priority of the currently-executed application occurring, and provide the notification not to cover the execution screen, in response to a notification of an application having a priority lower than the priority of the currently-executed application occurring.

According to an embodiment of the present disclosure, a method of providing a notification of an electronic device is provided and includes displaying an execution screen, in response to an application from among a plurality of applications to which different priorities are set being executed; displaying a notification message on the execution screen, in response to a notification of an application having a priority higher than a priority of the currently-executed application occurring, and providing the notification not to cover the execution screen, in response to a notification of an application having a priority lower than a priority of the currently-executed application occurring.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
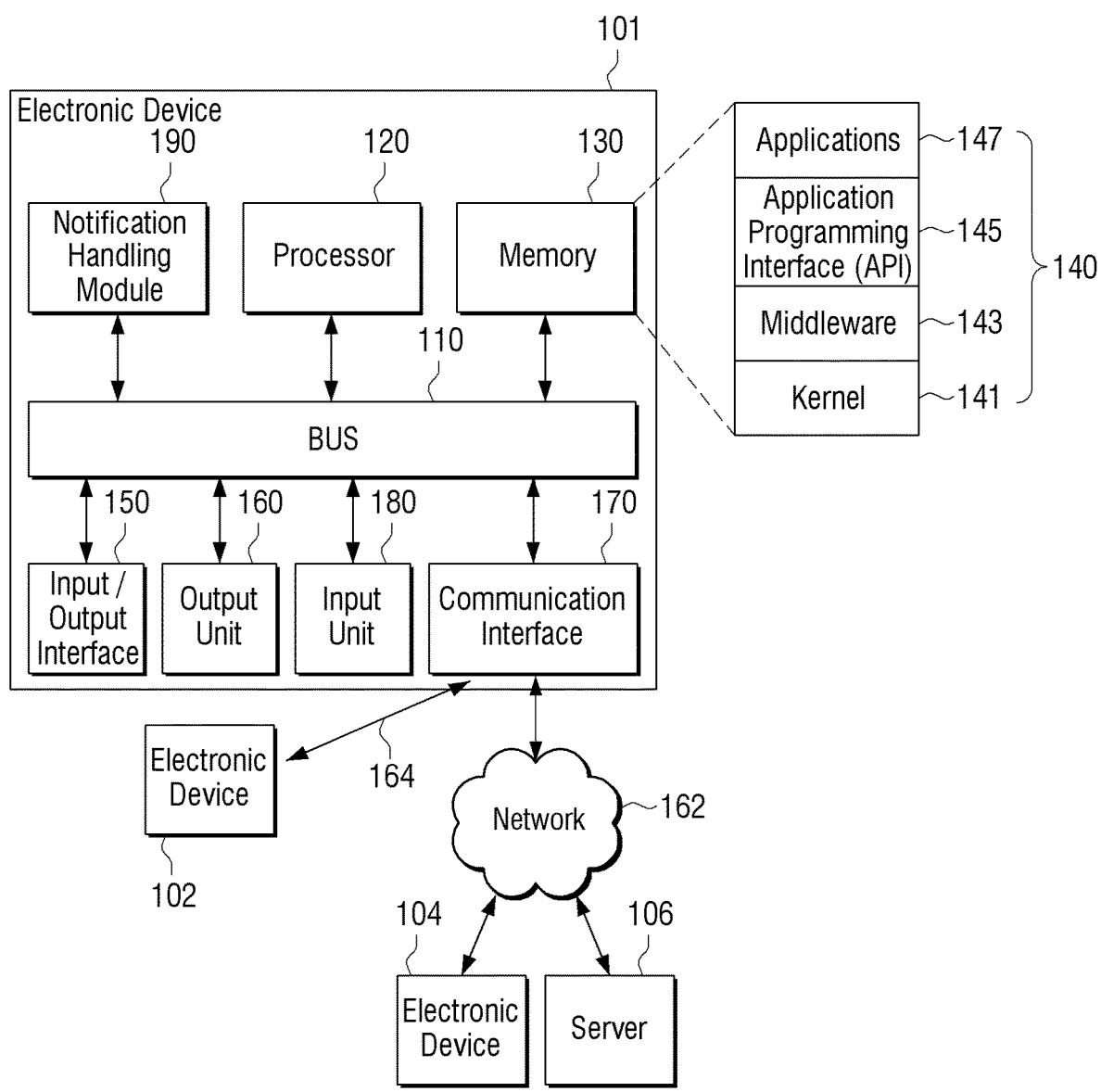
FIG. 1 is a block diagram illustrating an electronic device in a network environment according to various embodiments of present disclosure

To the extent possible, like reference numerals have been used to represent like elements in the figures. Further, those of ordinary skill in the art will appreciate that elements in the figures are illustrated for simplicity and may not have been necessarily drawn to scale. For example, the dimensions of some of the elements in the figures may be exaggerated relative to other elements to help to improve understanding of aspects of the present disclosure. Furthermore, one or more elements may have been represented in the figures by conventional symbols, and the figures may show only those specific details that are pertinent to understanding the embodiments of the present disclosure so as not to obscure the figures with details that will be readily apparent to those of ordinary skill in the art having benefit of the description herein.

It is understood that although illustrative implementations of the embodiments of the present disclosure are illustrated below, the present disclosure may be implemented using any number of techniques, whether currently known or in existence. The present disclosure should in no way be limited to the illustrative implementations, figures, and techniques illustrated below, including the design and implementation illustrated and described herein, but may be modified within the scope of the appended claims along with their equivalents.

The term "some" as used herein is defined as "none", "one", "more than one", or "all." Accordingly, the terms "none," "one", "more than one", "more than one, but not all", or "all" would all fall under the definition of "some." The term "some embodiments" may refer to no embodiments, one embodiment, several embodiments, or all embodiments. Accordingly, the term "some embodiments" is defined as meaning "no embodiment", "one embodiment", "more than one embodiment", or "all embodiments."

The terminology and structure employed herein is for describing, teaching, and illuminating some embodiments and their specific features and elements, and does not limit, restrict, or reduce the spirit and scope of the claims or their equivalents.

More specifically, any terms used herein such as but not limited to "includes", "comprises," "has", "consists", and grammatical variants thereof do not specify an exact limitation or restriction and do not exclude the possible addition of one or more features or elements, unless otherwise stated, and furthermore must not be taken to exclude the possible removal of one or more of the listed features and elements, unless otherwise stated with the limiting language "must comprise" or "needs to include."

Whether or not a certain feature or element was limited to being used only once, either way it may still be referred to as "one or more features", "one or more elements", "at least one feature", or "at least one element". Furthermore, the use of the terms "one or more" or "at least one" feature or element do not preclude there being none of that feature or element, unless otherwise specified by limiting language such as "there needs to be one or more . . . " or "one or more element is required".

Unless otherwise defined, all terms, and especially any technical and/or scientific terms, used herein may be taken to have the same meaning as commonly understood by one having an ordinary skill in the art.

Reference is made herein to some "embodiments". It should be understood that an embodiment is an example of a possible implementation of any features and/or elements presented in the attached claims. Some embodiments have been described for the purpose of illuminating one or more of the potential ways in which the specific features and/or elements of the attached claims fulfil the requirements of uniqueness, utility, and non-obviousness.

Use of the phrases and/or terms such as but not limited to "a first embodiment", "a further embodiment", "an alternate embodiment", "one embodiment", "an embodiment", "multiple embodiments", "some embodiments", "other embodiments", "further embodiment", "furthermore embodiment", "additional embodiment", or variants thereof do not necessarily refer to the same embodiments. Unless otherwise specified, one or more particular features and/or elements described in connection with one or more embodiments may be found in one embodiment, may be found in more than one embodiment, may be found in all embodiments, or may be found in no embodiments. Although one or more features and/or elements may be described herein in the context of only a single embodiment, or alternatively in the context of more than one embodiment, or further alternatively in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of some embodiments and therefore should not be necessarily taken as limiting factors to the attached claims. The attached claims and their legal equivalents can be realized in the context of embodiments other than the ones used as illustrative embodiments in the description below.

The electronic device may include a smartphone, a tablet personal computer (PC), a mobile phone, a video phone, an electronic book (e-book) reader, a desktop PC, a laptop PC, a notebook computer, a personal digital assistant (PDA), a portable multimedia player (PMP), an MP3 player, a mobile medical appliance, a camera, and a wearable device (e.g., head-mounted device (HMD), electronic glasses, electronic clothes, an electronic bracelet, an electronic necklace, an electronic accessory, electronic tattoos, a smart watch, etc.).

According to various embodiments of the present disclosure, the electronic device may be a smart home appliance. The home appliance may include a television (TV), a digital versatile disk (DVD) player, an audio player, a set-top box, a home automation panel, a security control panel, a TV box (e.g., Samsung HomeSync™, Apple TV™, or Google TV™), a game console (e.g., Xbox™ and PlayStation™), an electronic dictionary, a camcorder, and an electronic photo frame.

According to an embodiment of the present disclosure, the electronic device may include a navigation device, a global positioning system (GPS) receiver, an event data recorder (EDR), a flight data recorder (FDR), a vehicle infotainment device, an electronic device for a ship (e.g., a navigation device, a gyro-compass), avionics, security devices, an automotive head unit, a robot for home or industry, an automatic teller machine (ATM), a point of sales (POS) device, or an Internet of things (IoT) device.

According to various embodiments of the present disclosure, the electronic device may include a part of furniture or a building/structure, an electronic board, an electronic signature receiving device, and a projector.

According to various embodiments of the present disclosure, the electronic device may be a combination of one or more of the aforementioned various electronic devices. The electronic device may be a flexible device. Furthermore, the electronic device is not limited to the aforementioned electronic devices, and may include a new electronic device according to the development of future technology. As used herein, the term "user" may refer to a person who uses an electronic device or may refer to a device (e.g., an artificial intelligence (AI) electronic device) that uses an electronic device.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. The electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment of present disclosure, the module may be implemented in a form of an application specific integrated circuit (ASIC).

Various embodiments as set forth herein may be implemented as software (e.g., the program 140) including one or more instructions that are stored in a storage medium (e.g., internal memory or external memory) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of present disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of present disclosure, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

FIG. 1 is a block diagram illustrating an electronic device 101 in a network environment according to various embodiments of present disclosure. Referring to FIG. 1, an electronic device 101 in a network environment may communicate with an electronic device 102 via a first network 164 (e.g., a short-range wireless communication network), or an electronic device 104 or a server 106 via a second network 162 (e.g., a long-range wireless communication network). The electronic device 101 may communicate with the electronic device 104 via the server 106. The electronic device 101 may include a bus 110, a processor 120, a memory 130, an input/output interface 150, at least one output unit 160, a communication interface 170, at least one input unit 180, and a notification handling module 190. At least one (e.g., output unit 160 or input unit 180) of the components may be omitted from the electronic device 101, or one or more other components may be added in the electronic device 101.

The bus 110 may include a circuit for connecting the components of the electronic device 101, e.g., for connecting the processor 120, the memory 130, the input/output interface 150, the at least one output unit 160, the communication interface 170, the at least one input unit 180, the notification handling module 190, and transmitting communication between the components (e.g., control messages and/or data).

The processor 120 may execute, for example, software (e.g., a program 140) to control at least one other component (e.g., a hardware or software component) of the electronic device 101 coupled with the processor 120, and may perform various data processing or computation. According to an embodiment of present disclosure, as at least part of the data processing or computation, the processor 120 may load a command or data received from another component (e.g., the input/output interface 150 or the communication interface 170) in the memory 130, process the command or the data stored in the memory 130, and store resulting data in memory 130. The processor 120 may include a processor 120 (e.g., a central processing unit (CPU) or an application processor (AP)), and an auxiliary processor (e.g., a graphics processing unit (GPU), an image signal processor (ISP), a sensor hub processor, or a communication processor (CP)) that is operable independently from, or in conjunction with, the processor 120. Additionally or alternatively, the auxiliary processor may be adapted to consume less power than the main processor 120, or to be specific to a specified function. The auxiliary processor may be implemented as separate from, or as part of the processor 120.

The auxiliary processor may control at least some of functions or states related to at least one component (e.g., the output device 160, the input unit 180, or the communication interface 170) among the components of the electronic device 101, instead of the processor 120 while the processor 120 is in an inactive (e.g., sleep) state, or together with the processor 120 while the processor 120 is in an active state (e.g., executing an application). According to an embodiment of present disclosure, the auxiliary processor (e.g., an image signal processor or a communication processor) may be implemented as part of another component (e.g., the input module 180 or the communication interface 170) functionally related to the auxiliary processor.

The memory 130 may store various data used by at least one component (e.g., the processor 120 or input unit 180) of the electronic device 101. The various data may include, for example, software (e.g., the program 140) and input data or output data for a command related thereto. The memory 120 may include the volatile memory or the non-volatile memory.

The program 140 may be stored in the memory 130 as software, and may include, for example, a kernel 141, a middleware 143 an application programming interface (API) 145 and/or an application 147. At least some of the kernel 141, the middleware 143, and the API 145 may be referred to as an operating system (OS).

The input unit 180 may receive a command or data to be used by other component (e.g., the processor 120) of the electronic device 101, from the outside (e.g., a user) of the electronic device 101. The input unit 180 may include, for example, a microphone, a mouse, or a keyboard.

The communication interface 170 may support establishing a direct (e.g., wired) communication channel or a wireless communication channel between the electronic device 101 and the external electronic device (e.g., the electronic device 102, the electronic device 104, or the server 106) and performing communication via the established communication channel. The communication interface 170 may include one or more communication processors that are operable independently from the processor 120 (e.g., the AP) and supports a direct (e.g., wired) communication or a wireless communication. According to an embodiment of present disclosure, the communication interface 170 may include a wireless communication module (e.g., a cellular communication module, a short-range wireless communication module, or a global navigation satellite system (GNSS) communication module) or a wired communication module (e.g., a local area network (LAN) communication module or a power line communication (PLC) module). A corresponding one of these communication modules may communicate with the external electronic device via the first network 164 (e.g., a short-range communication network, such as Bluetooth™, wireless-fidelity (Wi-Fi) direct, or Infrared Data Association (IrDA)) or the second network 162 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module may identify and authenticate the electronic device 101 in a communication network, such as the first network 164 or the second network 162, using subscriber information (e.g., international mobile subscriber identity (IMSI)) stored in the subscriber identification module.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of present disclosure, commands or data may be transmitted or received between the electronic device 101 and the external electronic device 104 via the server 106 coupled with the second network 162. Each of the electronic devices 102 and 104 may be a device of a same type as, or a different type, from the electronic device 101. All or some of operations to be executed at the electronic device 101 may be executed at one or more of the external electronic devices 102, 104, or 106. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The kernel 141 may control or manage system resources (e.g., the bus 110, the processor 120, the memory 130) used for executing an operation or function implemented in other programs 140 (e.g., the middleware 143, the API 145, or the applications 147). Furthermore, the kernel 141 may provide an interface through which the middleware 143, the API 145 or the applications 147 may access individual components of the electronic device to control or manage system resources.

The middleware 143 may serve as an intermediary such that the API 145 or the application 147 communicates with the kernel 141 to transmit/receive data. Furthermore, in regard to task requests received from the applications 147, the middleware may perform a control (e.g., a scheduling or load balancing) for the task requests using a method of assigning at least one of the applications 147 a priority for using the system resources (e.g., the bus 110, the processor 120, or the memory 130) of the electronic device 101.

The API 145 is an interface by which the applications 147 control functions provided from the kernel 141 or middleware 143, and may include at least one interface or function, for example, instructions, for file control, window control, image processing, or text control.

The input/output interface 150 may serve as an interface that may transfer instructions or data, which is input from a user via the at least one input unit 180 or from another external device, to another component(s) of the electronic device 101. Further, the input/output interface 150 may output instructions or data received from another component(s) of the electronic device to a user via the output unit 160 or an external device.

The output unit 160 may include an audio module or a display module. The audio module may include a speaker, an earphone, or an equivalent thereof. The display module may include a liquid crystal display (LCD), a light emitting diode (LED) display, an organic light emitting diode (OLED) display, a micro-electro mechanical System (MEMS) display, an electronic paper display, a hologram device, a projector. The display may display various types of contents (e.g., text, images, videos, icons, or symbols) to users. The display may include a touch screen and in this case, may receive a touch gesture, a proximity gesture, or a hovering input using an electronic pen or a user's body portion.

The communication interface 170 may set communication between the electronic device 101 and the first electronic device 102, the second electronic device 104, or the server 106. For example, the communication interface 170 may be connected to a network through wireless or wired communication to communicate with the second external electronic device 104 or server 106.

The wireless communication may use long term evolution (LTE), LTE-advanced (LTE-A), a code division multiple access (CDMA), wideband CDMA (WCDMA), universal mobile telecommunication system (UMTS), wireless broadband (WiBro), and global system for mobile communication (GSM), as cellular communication protocol. The wired communication may include a universal serial bus (USB), a HDMI, recommended standard 232 (RS232) and a plain old telephone service (POTS).

The network 162 may include at least one of communication networks such as a computer network (e.g., a LAN or a WAN), the Internet, and a telephone network.

Each of the first external device 102 and the second external device 104 may be a device which is same as or different from the electronic device 101. The server 106 may include a group of one or more servers.

According to various embodiments of the present disclosure, all or some of the operations performed by the electronic device 101 may be performed by another electronic device or a plurality of electronic devices, such as the first external electronic device 102, the second external electronic device 104, or the server 106. When the electronic device 101 performs some functions or services automatically or by request, the electronic device 101 may request the first external electronic device 102, the second external electronic device 104, or the server 106 to perform at least some of the functions related to the functions or services, in addition to or instead of performing the functions or services by itself. In this case, the first external electronic device 102, the second external electronic device 104, or the server 106 may carry out the requested function or additional function, and transfers the results to the electronic device 101. The electronic device 101 may provide the requested functions or services based on the received result as is or after additionally processing the received result. To this end, cloud computing, distributed computing or client-server computing technology may be used.

According to various embodiments of the present disclosure, the input unit 180 can include a touch panel, a digital pen, a key, an ultrasonic input device, or a sensor. For example, the sensor can be for measuring a physical quantity or detecting an operation state of the electronic device 101 and converting the measured or detected information to an electrical signal. The sensor can include a gesture sensor, a gyro sensor, an atmospheric pressure sensor, a magnetic sensor, an acceleration sensor, a grip sensor, a proximity sensor, a color sensor (e.g., red, green, and blue (RGB) sensor), a biometric sensor, a temperature/humidity sensor, an illumination sensor, and an ultraviolet sensor. Additionally or alternatively, the sensor may include an electronic nose sensor, an electromyography (EMG) sensor, an electroencephalogram (EEG) sensor, an electrocardiogram (ECG) sensor, an infrared (IR) sensor, an iris sensor, and/or a fingerprint sensor.

Figure 2:
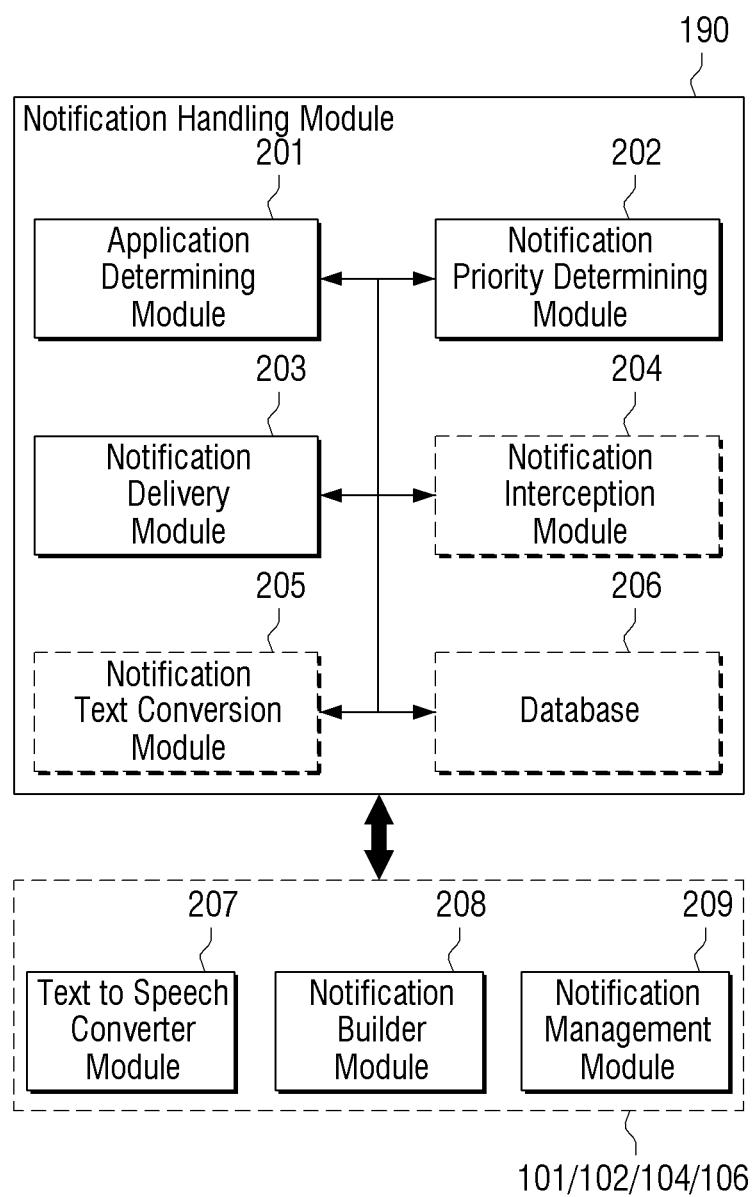
FIG. 2 is a block diagram of a notification handling module of an electronic device according to an embodiment of present disclosure.

FIG. 2 is a block diagram of a notification handling module 190 of an electronic device, according to an embodiment of present disclosure. Referring to FIG. 2, the notification handling module 190 may include an application determining module 201, a notification priority determining module 202, and a notification delivery module 203.

The application determining module 201 may determine a type of an application that is currently being executed in the electronic device 101. The application determining module may determine the type of application that is currently being executed in the electronic device 101 on the basis of resources the application consumes. The type of application may be an audio/video data based application and a non-audio data based application. The type of application may be one of a media playback application (e.g., a music or video playback application), a recording application (e.g., a voice recording application or a camera application), a document reading/editing application (e.g., a memo application, a paint application, a PDF viewing application, a word processing application), an e-book application, a healthcare application (e.g., an application for measuring an amount of exercise or blood sugar level), an application to which security information is input (e.g., a banking application), a web browser application, a gaming application, a voice call application, a video call application, an SMS application, a content sharing application, an virtual reality based application, an augmented reality based application and an application pertaining to a mode of operation of the electronic (e.g., a screen mirroring or screen sharing mode, a paired mode, and a remote operation mode).

The application that is currently being executed may be in different execution states. The execution states of an application may include a media content playback state, a media content streaming state, a user movement measurement state, a user movement detection state, a game content execution state, a content (e.g., text, an e-book, a webpage, an image, or an SMS) display state, a content (e.g., a text, an image, a gesture, a voice, or security information) input state, a content (e.g., a voice or an image) recording state, a call status (e.g., making a call or a call in progress), a content sharing status (e.g., establishment of a connection with another device, a sending status, or a receiving status), and various operations and execution states of various applications that may be possible.

The notification priority determining module 202 may determine a priority level associated with the notification. The notification priority determining module 202 may determine the priority level associated with the notification on the basis of a type of application being executed, details of the application being executed, a user defined priority level associated with the application being executed, a predefined priority level associated with the application being executed, a type of notification, a user defined priority value associated with the notification, a predefined priority value associated with the notification, a transactional characteristics associated with the notification, a category of the notification, and an electronic device mode. Details of an application being executed may include various details including, for example, information pertaining to the execution state of the application being executed.

The notification delivery module 203 may generate a modified notification by modifying at least one parameter pertaining to the output of the notification based on the type of application and the priority level associated with the notification. The at least one parameter pertaining to the output of the notification may be a type of the output unit, details of the output unit, a time of output of the modified notification, a volume related parameter, and a display related parameter.

The notification delivery module 203 may further provide the modified notification on an output unit associated with the electronic device. The output unit may be a standalone unit that may be operably connected to the electronic device 101. The output unit may form part of the first external electronic device 102, the second external electronic device 104, or the server 106 that may be operably connected to the electronic device 101. The output unit 160 which forms part of the electronic device 101 may provide the aforesaid functionality.

The notification handling module 190 may further include a notification interception module 204 and a notification text conversion module 205.

The notification interception module 204 may intercept the notification and detect a type of notification. The type of notification may be an audio/video data type notification (e.g., an incoming call notification, an alarm related notification, etc.) and a non-audio data type notification (e.g., a SMS notification, an e-mail notification, etc.).

The type of notification may be a transactional type notification, e.g., a notification that requires an output be provided within a specific time (e.g., an incoming call notification, a calendar event notification, a reminder event notification, etc.) and a non-transactional type notification, e.g., a notification that does not require an output to be provided within a specific time period (e.g., a missed call notification, a promotion related notification, and a recommendation related notification).

The notification interception module 204 may further detect a category of notification. The category of the notification may be a call category (e.g., a voice call or a video call), a message category (e.g., an SMS, a multimedia message service (MMS), a unstructured supplementary service data (USSD), etc.), an e-mail category, an event category (e.g., a calendar event), a promotion category, an advertisement category, an alarm category (e.g., an alarm or a timer), a progress category (e.g., progress of a running background operation), a social category (e.g., social networking site (SNS) based application), an error category (e.g., an error in background operation or authentication status), a transport category (e.g., a media transport control for playback), a system category (e.g., a system or device update status or a category reserved only for system use), a service category (e.g., an indication of running background service), a recommendation category (e.g., a specific, timely recommendation for a single thing, for example, a news application might recommend a news story the user might want to read next), and a status category (e.g., an ongoing information about device or contextual status).

The notification text conversion module 205 may detect a first content forming part of the notification, obtain a meaning of the first content and generate a second content such that the second content has substantially the same meaning as that of the first content. The second content may thereafter be used for generating the modified notification.

The notification text conversion module 205 may detect a text forming part of the notification and convert the same into a meaningful text on the basis of set of rules. The set of rules may be stored in a database 206. Any one or both of the notification text conversion module 205 and the database 206 may form part of the notification handling module 190. Any one or both of the notification text conversion module 205 and the database 206 may form part of the electronic device 101 and may be in operational association with the notification handling module 190. Any one or both of the notification text conversion module 205 and the database 206 may form part of the first external electronic device 102, the second external electronic device 104, or the server 106 that may be operably connected to the electronic device 101.

The notification handling module 190 may be in operational association with a text to speech converter module 207. The text to speech converter module 207 may convert a text based notification to a speech based notification and provide the speech based notification to the output unit associated with the electronic device 101. The text to speech converter module 207 may form part of the electronic device 101 and may be in operational association with the notification handling module 190. The text to speech converter module 207 may form part of the first external electronic device 102, the second external electronic device 104, or the server 106 that may be operably connected to the electronic device 101. The text to speech converter module 207 may form part of the notification handling module 190.

The notification handling module 190 may be in operational association with a notification builder module 208. In particular, the notification builder module may be in association with the notification text conversion module 205 and the notification delivery module 203. The notification builder module 208 may receive the second content from the notification text conversion module and generate the modified notification and provide the modified notification to the notification delivery module 203. The notification builder module 208 may form part of the notification delivery module 203. The notification builder module 208 may form part of the notification handling module 190, without forming part of the notification delivery module 203. The notification builder module 208 may form part of the electronic device 101 and may be in operational association with the notification handling module 190. The notification builder module 208 may form part of the first external electronic device 102, the second external electronic device 104, or the server 106 that may be operably connected to the electronic device 101.

The notification handling module 190 may be in operational association with a notification management module 209. The notification management module 209 may control the notification handling module 190. The notification management module 209 may control activation and deactivation of the notification handling module 190 such that in an activated state, the notification handling module 190 performs the task of handling the notifications while executing an application on the electronic device.

The notification management module 209 may store settings associated with operation of the notification handling module 190 such that the notification handling module 190 may access the settings and based on the settings perform the task of handling the notifications while executing an application on the electronic device. The settings can include selection of a type of application, details of a type of application, a user defined priority value associated with an application, a predefined priority value associated with the application, a type of notification, a user defined priority value associated with a notification, a predefined priority value associated with a notification, a category of notification, an electronic device mode definition. The settings can include information in relation to the parameter pertaining to the output of the notification.

It may be noted that the notification handling module 190 may be provided with an additional module to determine whether the modified notification prompts a user to provide an input. In case the modified notification prompts a user to provide an input, such additional module may be further adapted to start a timer (e.g., with a predefined value "t") for accepting input from the user. Alternatively, the processor 120 may be adapted to determine whether the modified notification prompts a user to provide an input and to start a timer for accepting input from the user. The processor 120 (either alone or along with other elements present in the electronic device) may be further adapted to perform a task, as per the user's input.

Figure 3:
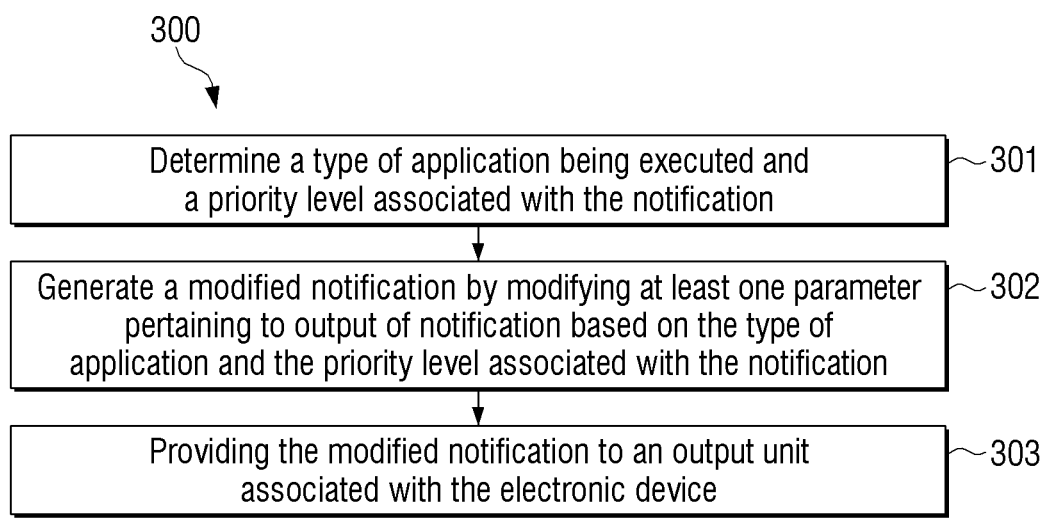
FIG. 3 is a flowchart of an operation for handling controlling notification in an electronic device according to an embodiment of present disclosure.

FIG. 3 is a flowchart 300 of an operation for handling controlling notification in an electronic device according to an embodiment of the present disclosure. Referring to FIG. 3, in step 301, the electronic device 101 determines a type of application being executed and a priority level associated with the notification. In step 302, the electronic device 101 generates a modified notification by modifying at least one parameter pertaining to the output of the notification based on the type of application and the priority level associated with the notification. In step 303, the electronic device 101 provides the modified notification to an output unit associated with the electronic device.

According to an embodiment of the present disclosure, at least one other operation may be added before, or after or between the operations as illustrated in FIG. 3. At least one of the operations illustrated in FIG. 3 may be performed in parts. The operations as illustrated in FIG. 3 may be sequentially processed or the execution steps of at least one operation may be switched with that of another operation.

Figure 4:
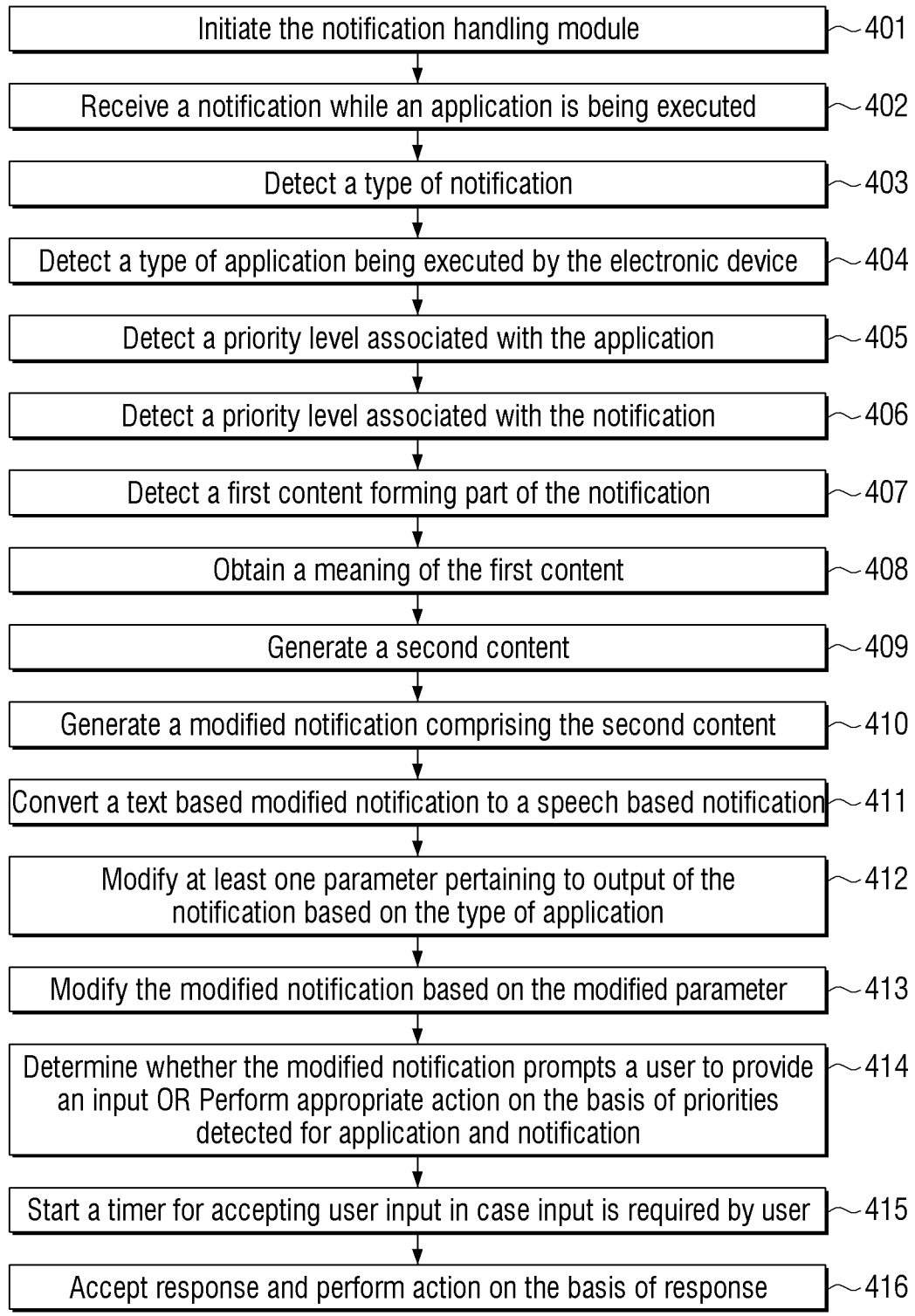
FIG. 4 is a flowchart of an operation for handling controlling notification in an electronic device according to an embodiment of present disclosure.

FIG. 4 is a flowchart of an operation for handling controlling notification in an electronic device according to an embodiment of the present disclosure. Referring to FIG. 4, in step 401 the electronic device initiates the notification handling module 190. In step 402, the electronic device 101 receives a notification while an application is being executed by the electronic device 101. In step 403, the electronic device 101 detects a type of notification, wherein the type of notification can be an audio/video data type notification and a non-audio data type notification.

In step 404, the electronic device 101 detects a type of application being executed by the electronic device 101. In step 405, the electronic device detects a priority level associated with the application. In step, 406, the electronic is detecting a priority level associated with the notification.

In step 407, the electronic device 101 detects a first content forming part of the notification. In step 408, the electronic device obtains a meaning of the first content. In step 409, the electronic device 101 generates a second content, the second content having substantially the same or similar meaning as that of the first content. In step 410, the electronic device 101 generates the modified notification comprising the second content. In step 411, the electronic device 101 converts a text based notification to a speech based notification, wherein the text based notification may contain either the first content or alternatively the second content. In step 412, the electronic device 101 modifies at least one parameter pertaining to the output of the notification based on the type of application and the priority level associated with the notification. In step 413, the electronic device 101 modifies the modified notification based on the modified parameter. In step 414, the electronic device 101 determines whether the modified notification prompts a user to provide an input or perform appropriate action on the basis of the priorities detected for application and notification. In step 415, the electronic device 101 starts a timer for accepting a user input in case the input is required from user. In step 416, the electronic device 101 accepts a response as provided by the user and performing an action on the basis of the response.

In the following paragraphs, using embodiments and Tables 1 to 7, step 406 (detecting a priority level associated with the notification), step 412 (modifying at least one parameter pertaining to output of the notification based on the type of application), and the priority level associated with the notification to obtain a modified parameter are illustrated. The embodiments do not restrict the scope of the claims.

Table 1 illustrates four notifications, namely N1, N2, N3 and N4 along with their details.

TABLE 1

Sample Notifications, their types and their corresponding initial parameters

| Notification Details | Notification Type | Parameter 1 Type of O/P | Parameter 2 Details of O/P | Parameter 3 Time of O/P | Parameter 4 Volume | Parameter 5 Display |
|---|---|---|---|---|---|---|
| N1 | A/V | A/V | Audio & display units of same device | Do Not Delay | Full Volume | Normal Size |
| N2 | A/V | A/V | Audio & display units of same device | Do Not Delay | Full Volume | Normal Size |
| N3 | Non-Audio | Non-Audio | Display unit of same device | Do Not Delay | Not Applicable | Normal Size |
| N4 | Non-Audio | Non-Audio | Display unit of same device | Do Not Delay | Not Applicable | Normal Size |

Table 1 illustrates Notifications N1 and N2 are of an audio/visual (A/V) data type notifications, while Notifications N3 and N4 are of non-audio type. Despite the fact that the notifications are of different types, in terms of their initial allocated parameter, there is not much change. For example, parameter 2 (details of O/P, Output), parameter 3 (time of O/P), parameter 4 (volume related parameter) and parameter 5 (display related parameter) have identical values for all notifications. Also, in respect of these notifications, there is no priority value associated to any of the notifications.

Thus, upon receipt of any of such notification, a priority level associated with the notification is detected. The priority level associated with the notification may be determined on the basis of at least one of a type of application being executed, details of the application being executed, a user defined priority level associated with the application being executed, a predefined priority level associated with the application being executed, a type of notification, a user defined priority value associated with the notification, a predefined priority value associated with the notification, a transactional characteristics associated with the notification, a category of the notification, and an electronic device mode.

The type of application that is currently being executed in the electronic device 101 may be determined on the basis of resources the application consumes. The type of application may be at least one of an audio/video data based application and a non-audio data based application. The type of application may be one of a media playback application (e.g., a music or video playback application), a recording application (e.g., a voice recording application or a camera application), a document reading/editing application (e.g., a memo application, a paint application, a PDF application, a word processing application), an e-book application, a healthcare application (e.g., an application for measuring an amount of exercise or blood sugar level), an application to which security information is input (e.g., a banking application), a web browser application, a gaming application, a voice call application, a video call application, an SMS application, a content sharing application and an application pertaining to a mode of operation of the electronic (e.g., a screen mirroring or screen sharing mode, a paired mode, and a remote operation mode).

Table 2 illustrates an embodiment of the priority values determined for Notifications N1, N2, N3 and N4.

TABLE 2

Priority Values Determined for Notifications as per First Example

| Application | Notification | Priority |
| --- | --- | --- |
| App1 | N1 | High |
| App1 | N2 | Low |
| App1 | N3 | High |
| App1 | N4 | Low |
| App2 | N1 | High |
| App2 | N2 | Low |
| App2 | N3 | High |
| App2 | N4 | Low |

As illustrated in Table 2, App1 is an audio/video data based application and App2 is a non-audio data based application. It can be seen that all notifications do not carry an equal priority value in respect of a particular application. More particularly, notifications N1 and N3 have a high priority value compared to notifications N2 and N4.

Table 3 illustrates the priority values determined for Notifications N1, N2, N3 and N4.

TABLE 3

Priority Values Determined for Notifications as per Second Example

| Notification | Application | Priority |
| --- | --- | --- |
| N1 | App1 | High |
| N1 | App2 | Low |

TABLE 3-continued

Priority Values Determined for Notifications as per Second Example

| Notification | Application | Priority |
| --- | --- | --- |
| N2 | App1 | High |
| N2 | App2 | Low |
| N3 | App2 | High |
| N3 | App1 | Low |
| N4 | App2 | High |
| N4 | App1 | Low |

As illustrated in Table 3, App1 is an audio/video data based application and App2 is a non-audio data based application. It can be seen that a particular notification need not carry the same priority value for each of the applications. For example, each of notifications N1 and N2 may take a high priority value when the application being executed by the electronic device is App1. On the other hand, if the application being executed by the electronic device is App2, the notifications N1 and N2 may take a low priority value. However, each of notifications N3 and N4 take a low priority value when the application being executed by the electronic device is App1 and take a high priority when the application being executed by the electronic device is App2.

Once the priority value has been determined and the type of application is known, it is possible to modify at least one parameter pertaining to output of the notification to obtain a corresponding modified parameter.

If the applications (e.g., App1 and App2), the notifications (e.g., N1, N2, N3 and N4) and the priorities are as per Table 2, a sample modification in respect of parameter 1 (e.g., type of output) to obtain modified parameter 1 is illustrated in Table 4.

TABLE 4

Modification of parameter 1 corresponding to Table 2

| Application | Notification | Priority | Modified Parameter 1 |
| --- | --- | --- | --- |
| App1 | N1 | High | A/V |
| App1 | N2 | Low | A/V |
| App1 | N3 | High | Non-Audio |
| App1 | N4 | Low | Only Audio |
| App2 | N1 | High | Only Audio |
| App2 | N2 | Low | Only Audio |
| App2 | N3 | High | Only Audio |
| App2 | N4 | Low | Only Audio |

If the applications (e.g., App1 and App2), the notifications (e.g., N1, N2, N3 and N4) and the priorities are as per Table 2 provided above, instead of or in addition to modifying parameter 1, it is possible to modify one or more of parameter 2, parameter 3, parameter 4 and parameter 5 to obtain modified parameter 2, modified parameter 3, modified parameter 4 and modified parameter 5, respectively and a sample of such modification is illustrated in Table 5.

TABLE 5

Sample modification of other parameter(s) corresponding to Table 2

| Application | Notification | Priority | Modified Parameter 2 | Modified Parameter 3 | Modified Parameter 4 | Modified Parameter 5 |
|---|---|---|---|---|---|---|
| App1 | N1 | High | Same Audio and Display Units | Do not delay | Full Volume | Reduce size by 50% |
| App1 | N2 | Low | Audio and Display units of Connected Device | Do not delay | Half Volume | Reduce size by 50% |
| App1 | N3 | High | Display unit of Connected Device | Do not delay | Not Applicable | Reduce size by 50% |
| App1 | N4 | Low | Audio Unit of the same device | Delay | Half Volume | Not Applicable |
| App2 | N1 | High | Audio unit of the same device | Do not delay | Full Volume | Not Applicable |
| App2 | N2 | Low | Audio unit of the same device | Do not delay | Half Volume | Not Applicable |
| App2 | N3 | High | Audio unit of the same device | Delay | Half Volume | Not Applicable |
| App2 | N4 | Low | Audio unit of the same device | Delay | Half Volume | Not Applicable |

If applications (e.g., App1 and App2), the notifications (e.g., N1, N2, N3 and N4) and the priorities are as per Table 3 provided above, a sample modification in respect of parameter 1 (e.g., type of output) to obtain Modified parameter 1 is illustrated in Table 6.

TABLE 6

Sample modification of parameter 1 corresponding to Table 3

| Notification | Application | Priority | Modified Parameter 1 |
|---|---|---|---|
| N1 | App1 | High | A/V |
| N1 | App2 | Low | Only Audio |
| N2 | App1 | High | A/V |
| N2 | App2 | Low | Only Audio |
| N3 | App2 | High | Non-Audio |
| N3 | App1 | Low | Only Audio |
| N4 | App2 | High | Only Audio |
| N4 | App1 | Low | Only Audio |

If the applications (e.g., App1 and App2), the notifications (e.g., N1, N2, N3, and N4) and the priorities are as per Table 3 provided above, instead of or in addition to modifying parameter 1, it is possible to modify one or more of parameter 2, parameter 3, parameter 4 and parameter 5 to obtain modified parameter 2, modified parameter 3, modified parameter 4 and modified parameter 5, respectively, and a sample of such modification is illustrated in Table 7.

TABLE 7

Sample modification of parameter(s) corresponding to Table 3

| Notification | Application | Priority | Modified Parameter 2 | Modified Parameter 3 | Modified Parameter 4 | Modified Parameter 5 |
|---|---|---|---|---|---|---|
| N1 | App1 | High | Audio and Display Units of same device | Do not delay | Full Volume | Reduce size by 50% |

TABLE 7-continued

Sample modification of parameter(s) corresponding to Table 3

| Notification | Application | Priority | Modified Parameter 2 | Modified Parameter 3 | Modified Parameter 4 | Modified Parameter 5 |
|---|---|---|---|---|---|---|
| N1 | App2 | Low | Audio Unit of the same Device | Do not delay | Half Volume | Not Applicable |
| N2 | App1 | High | Audio and Display unit of Connected Device | Do not delay | Not Applicable | Reduce size by 50% |
| N2 | App2 | Low | Audio Unit of the same device | Delay | Half Volume | Not Applicable |
| N3 | App2 | High | Display Unit of Connected Device | Do not delay | Not Applicable | Reduce size by 50% |
| N3 | App1 | Low | Audio unit of the same device | Do not delay | Half Volume | Not Applicable |
| N4 | App2 | High | Audio unit of the same device | Delay | Half Volume | Not Applicable |
| N4 | App1 | Low | Audio unit of the same device | Delay | Half Volume | Not Applicable |

It may be noted that while in Tables 2 and 3, the priority values are determined as either "High" or "Low", i.e. as one among two priority levels, it is possible to determine the priority value by adopting different mechanisms. For example, the priority value can be determined as one of three priority levels, which may be "low", "medium", and "high". For example, the priority value can be determined as one of five priority levels, which may be "low", "low-medium", "medium", "medium-high", and "high". For example, the priority value can be expressed in terms of a numerical value, which may be expressed in terms of a percentage, a weight, or a percentile. Thus, in general, the priority values is determined as one among "n" options, wherein n is greater than or equal to 2.

Referring to Tables 1, 4 and 6, parameter 1, which is any one of A/V type or non-audio type gets modified to modified parameter 1 which can be any one of A/V type, only audio type or non-audio type in respect of certain notifications. It is possible that parameter 1 can be of a different type that is not illustrated in Table 1 and likewise, the modified parameter 1 can be of a different type not illustrated in Table 4 or 6.

Referring to Tables 1, 5 and 7, parameter 2, which has only one option of audio and display units of the same device gets modified to modified parameter 2 which can be any one of (a) audio and display units of the same device, (b) audio and display units of a connected device, (c) display unit of a connected device and (d) audio unit of same device. It may however be noted that it is possible that parameter 2 can be of a different type not illustrated in Table 1 and likewise, the modified parameter 2 can be of a different type not illustrated in Table 5 or 7.

Likewise, it can be seen that parameter 3, which has only one option, of do not delay, gets modified to modified parameter 3 which can be any one of (a) do not delay and (b) allow for delay. It may however be noted that it is possible that parameter 3 can be of both types (e.g., do not delay as well as allow for delay). Also, in relation to modified parameter 3, the delay in respect of different types of notifications can be set differently.

Parameter 4, which is any one of a full volume type or a not applicable type gets modified to modified parameter 4 which can be any one of (a) a full volume type, (b) a half volume type or (c) a not applicable type. It may however be noted that it is possible that parameter 4 and modified parameter 4 can be of additional types, for example, the volume can have different levels.

Parameter 5, which has only one option of normal size gets modified to modified parameter 5 which can be any one of (a) normal size, (b) a size reduced by 50% or (c) not applicable type. It may however be noted that it is possible that parameter 5 and modified parameter 5 can be of additional types, for example, the size can have different reduction levels, the modification may result in overlay options of different types, depiction at different zones, etc.

Apart from the parameters as described above, the modification can be in relation to any other parameter, which is perceivable by a user of the electronic device.

Based on the modified parameter corresponding to the modified notification, the electronic device provides the modified notification to an output unit associated with the electronic device.

As illustrated in Table 8, different applications can be associated with different priority levels.

TABLE 8

Priority Values Associated with Applications

| Application | Priority Value associated with Application |
|---|---|
| App1 | High |
| App2 | Medium-High |
| App3 | Medium |
| App4 | Low-Medium |
| App5 | Low |

In such as case, the disclosure enables for the determining the priority value associated with the notification by taking into consideration the priority value assigned to the application being executed by the electronic device. A notification can be have different priority value depending upon the priority value of the application being executed. Sample priority value associated with the notification is illustrated in Table 9.

TABLE 9

Priority Value Associated with a notification

| Application | Priority Associated with Application | Priority Associated with Notification |
|---|---|---|
| App1 | High | Low-Medium |
| App2 | Medium-High | Low-Medium |
| App3 | Medium | Medium |
| App4 | Low-Medium | Medium-High |
| App5 | Low | Medium-High |

Once the priority value associated with the notification has been obtained, it is possible to generate a modified notification by implementing the method as described above.

FIGS. 5A to 5D illustrate handling a call related notification while executing a gaming application according to an embodiment of the present disclosure.

Figure 5A:
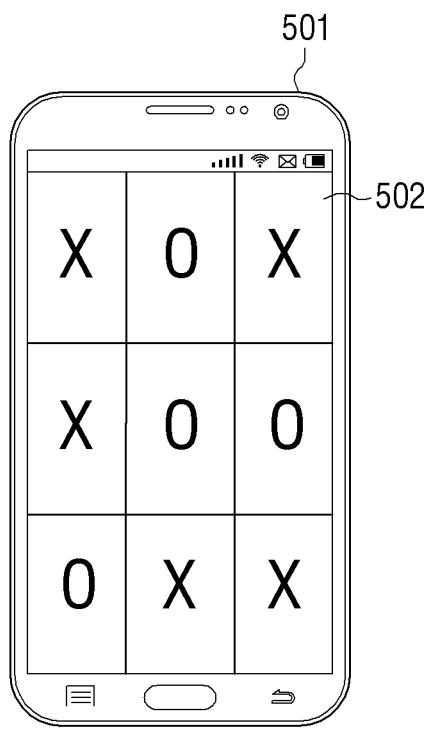
FIGS. 5A to 5D illustrate handling a call related notification while executing a gaming application according to an embodiment of present disclosure.

Referring to FIG. 5A, a scenario is illustrated wherein the electronic device (e.g., a mobile device) is executing a gaming application and therefore, a display unit 501 associated with the electronic device is rendering a graphical user interface 502 pertaining to the gaming application. Assuming that at this point in time, an incoming call is received by the electronic device, the electronic device will generate a notification and provide the notification to an output device associated with the electronic device.

Figure 5B:
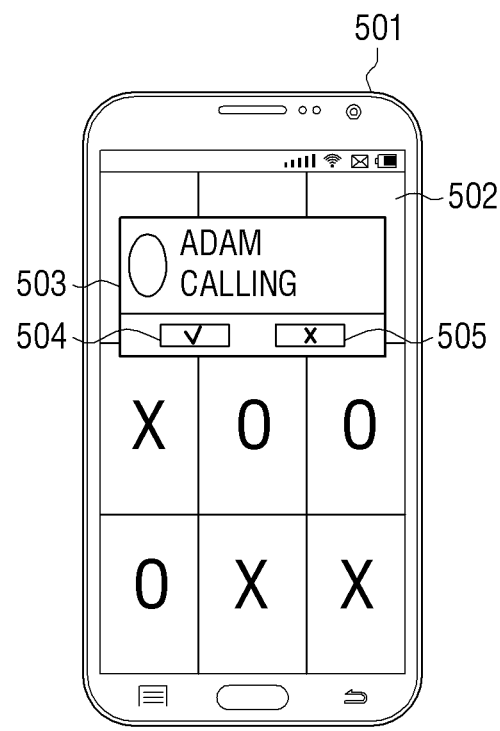

Referring to FIG. 5B, a conventional scenario is illustrated as per the prior art, wherein a notification 503 pertaining to the incoming call is provided to display unit 501 associated with the electronic device and rendered on the graphical user interface 502 pertaining to the gaming application. The notification 503 contains action options for acceptance of the call 504 or for rejecting the call 505. In response to receive input via any of the action options, the corresponding action is performed.

Figure 5C:
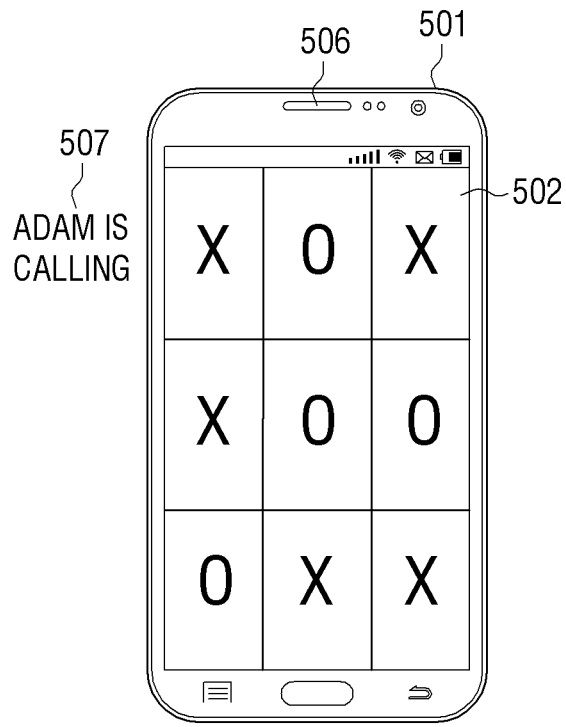

Referring to FIG. 5C, a scenario is illustrated in accordance with an embodiment of present disclosure. Comparing FIGS. 5B and 5C, it can be seen that the notification is of an A/V type, while the modified notification is of only audio type. Thus, it can be observed that an audio output unit 506 associated with the electronic device provides the modified notification 507, which is in the form an audio message.

Figure 5D:
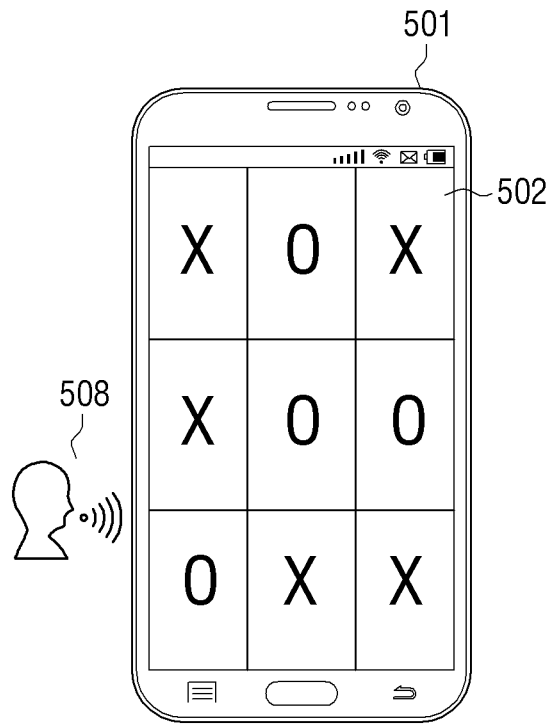

Furthermore, referring to FIG. 5D, the electronic device can detect voice command 508 from the user corresponding to the action options. For example, in response to detecting a voice command "accept" (or any other equivalent or any predefined voice command), the call can be connected. Alternatively, in response to detecting a voice command "reject" (or any other equivalent or any predefined voice command), the call can be rejected.

If the gaming application is being executed and the incoming notification pertains to a "call" from "Adam", then a modified notification in A/V format but having a reduced size, compared to the size of the original notification can be provided on the output unit (e.g., the size of the modified notification can be 50% of the size of the original notification as shown in FIG. 5B).

If the gaming application is being executed and the incoming notification pertains to a "call" from "Adam", then a modified notification in A/V format but having a level of transparency that is different (e.g., higher) than the level of transparency of the original notification can be presented on the output unit 501.

If the gaming application is being executed and the incoming notification pertains to a "call" from "Adam", then a modified notification in A/V format can be presented at a different location (e.g., a location of rendering the modified notification can be different from the location of rendering of the original notification as shown in FIG. 5B).

If the gaming application is being executed by the electronic device and the incoming notification pertains to a "call" from "Adam", then a modified notification in A/V format can be presented in a different electronic device that may be operably connected to the electronic device on which the gaming application is being executed (e.g., the modified notification in A/V format can be presented on a smart watch, that may be connected to the mobile device on which the gaming application is being executed).

Figure 6A:
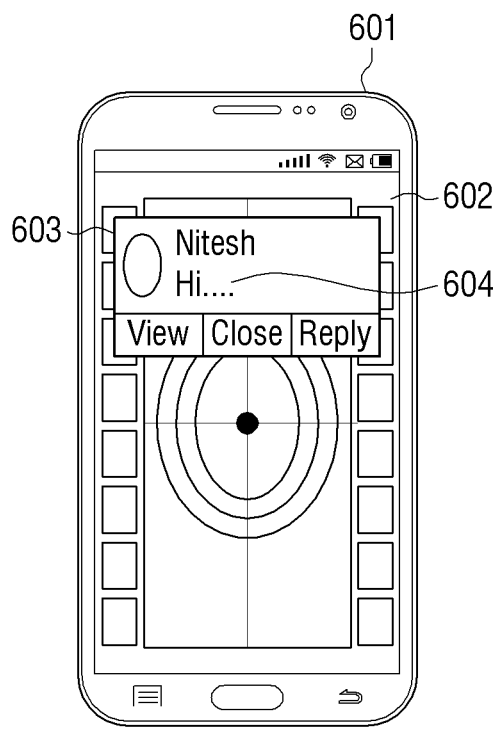
FIGS. 6A to 6C illustrate handling a short message service (SMS) related notification while executing a video-streaming (or movie watching) application according to an embodiment of present disclosure.
Figure 6B:
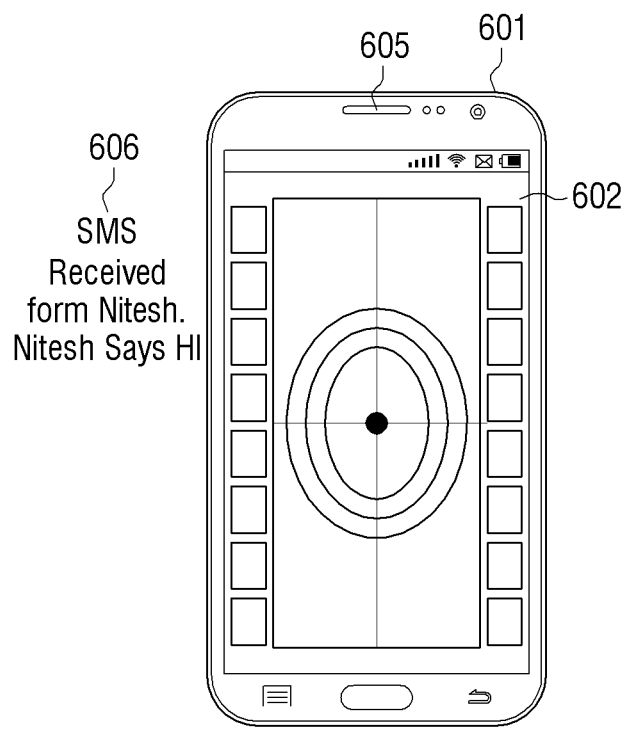
Figure 6C:
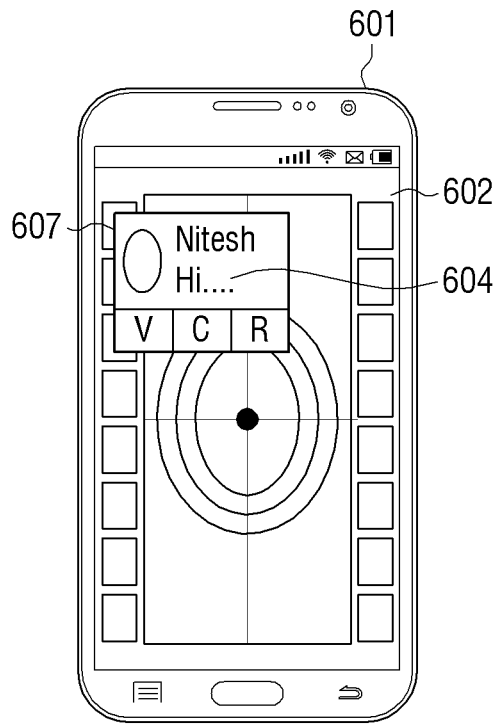

FIGS. 6A to 6C illustrate handling an SMS related notification while executing a video-streaming (or movie watching) application according to an embodiment of the present disclosure.

Referring to FIG. 6A, a conventional scenario is illustrated as per the prior art, wherein a notification 603 pertaining to the incoming SMS is provided to a display unit 601 associated with the electronic device and rendered on the graphical user interface 602 pertaining to a multimedia application (e.g., movie watching/video streaming) The notification 603 provides a preview 604 of the content of the SMS.

Referring to FIG. 6B, a scenario is illustrated in accordance with an embodiment of present disclosure. Comparing FIGS. 6A and 6B, it can be seen that the notification is in text format, while the modified notification is of a only audio type. Thus, it can be observed that an audio output unit 605 associated with the electronic device provides the modified notification 606, which is in the form an audio message. The electronic device may provide the modified notification in audio format which says "SMS received from Nitesh" to an audio output unit 605 associated with the electronic device. In addition to the above, the electronic device may convert the text contained in the SMS into an audio format and play the same. For example, an additional audio notification can be provided "Nitesh says—Hi". This action may be performed, in response to user specific command, for example, a command equivalent to viewing command.

Referring to FIG. 6C, a scenario is illustrated wherein the modified notification 607 is in an A/V format but having a reduced size (e.g., the size of the modified notification 607 can be 50% of the size of the original notification as shown in FIG. 6A). The modified notification is provided to display unit 601 associated with the electronic device and rendered on the graphical user interface 602 pertaining to multimedia application (e.g., movie watching/video streaming) The modified notification 607 may provide s preview 604 of the content of the SMS.

If a movie watching/video streaming application is being executed and the incoming notification is of an "SMS" from "Nitesh" with content "Hi", then a modified notification can be:

- in an A/V format but having a level of transparency that is different (e.g., higher) than the level of transparency of the original notification can be presented on the output unit;
- in an A/V format can be presented at a different location (e.g., a location of rendering the modified notification can be different from the location of rendering of the original notification as shown in FIG. 6A).
- in an A/V format can be presented in a different electronic device that may be operably connected to the electronic device on which the video watching application is being executed (e.g., the modified notification in A/V format can be presented on a smart watch, that may be connected to the mobile device on which the video watching application is being executed).

If a gaming application is being executed and the incoming notification is of an "SMS" from "Nitesh" with content "Hi", then a modified notification can be:

- of an only audio type and the electronic device may provide the modified notification in audio format which says "SMS received from Nitesh" to an audio output unit associated with the electronic device;
- in an A/V format but having a reduced size can be provided on the output unit (e.g., the size of the modified notification can be 50% of the size of the original notification);
- in an A/V format but having a level of transparency that is different (e.g., higher) than the level of transparency of the original notification can be presented on the output unit;
- in an A/V format can be presented at a different location (e.g., a location of rendering the modified notification can be different from the location of rendering of the original notification);
- in an A/V format can be presented in a different electronic device that may be operably connected to the electronic device on which the gaming application is being executed (e.g., the modified notification in an A/V format can be presented on a smart watch, that may be connected to the mobile device on which the gaming application is being executed).

Figure 7A:
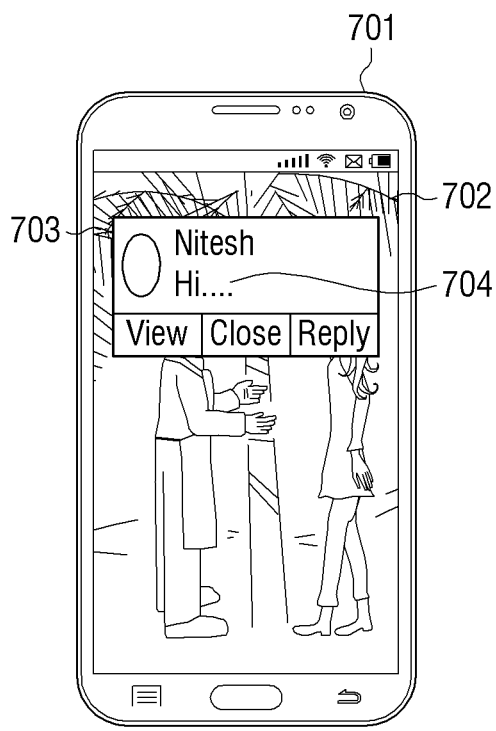
FIGS. 7A to 7C illustrate handling an SMS related notification while executing a camera application according to an embodiment of present disclosure.
Figure 7B:
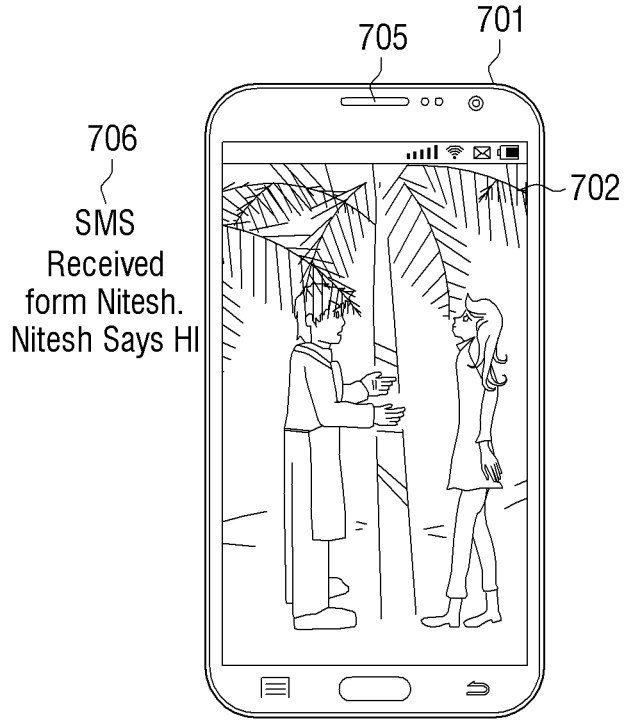
Figure 7C:
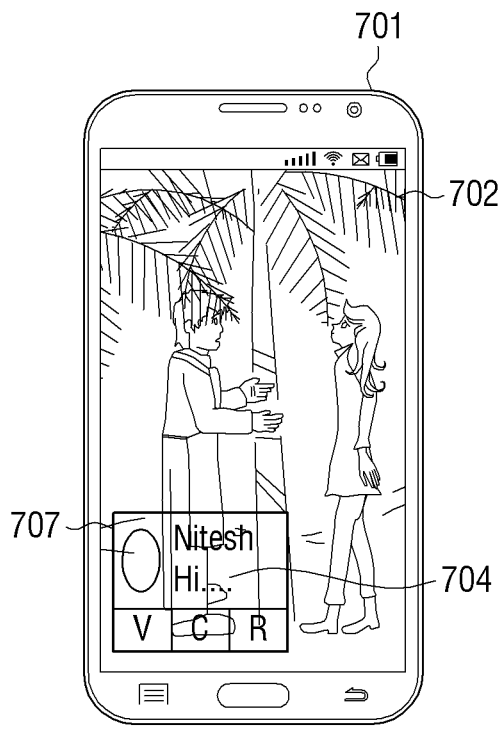

FIGS. 7A to 7C illustrate handling an SMS related notification while executing a camera application according to an embodiment of the present disclosure.

Referring to FIG. 7A, a conventional scenario is illustrated as per the prior art, wherein a notification 703 pertaining to the incoming SMS is provided to display unit 701 associated with the electronic device and rendered on the graphical user interface 702 pertaining to a camera application. The notification 703 provides a preview 704 of the content of the SMS.

Referring to FIG. 7B, a scenario is illustrated in accordance with an embodiment of present disclosure. Comparing FIGS. 7A and 7B, it can be seen that the notification is in text format, while the modified notification is of an only audio type. Thus, it can be observed that an audio output unit 705 associated with the electronic device provides the modified notification 706, which is in the form an audio message. The electronic device may provide to the modified notification in audio format which says "SMS received from Nitesh" to an audio output unit 705 associated with the electronic device. The electronic device may convert the text contained in the SMS into an audio format and play the same. For example, an additional audio notification can be provided "Nitesh says—Hi". This action may be performed, in response to user specific command, for example, a command equivalent to a viewing command.

Referring to FIG. 7C, a scenario is illustrated wherein the modified notification 707 is in an A/V format but having a reduced size (for example, the size of the modified notification 707 can be 50% of the size of the original notification 703). The modified notification is provided to display unit 701 associated with the electronic device and rendered on the graphical user interface 702 pertaining to the camera application. The modified notification 707 may provide preview 704 of the content of the SMS. Although not essential, the modified notification 707 is also illustrated to have a level of transparency that is higher than the level of transparency of the original notification 703. The modified notification 707 is illustrated as being presented at a different location compared to a location of rendering of the original notification 703.

If a camera application is being executed and the incoming notification is of an "SMS" from "NITESH" with content "Hi", then a modified notification can be:

- in an A/V format can be presented in a different electronic device that may be operably connected to the electronic device on which the camera application is being executed (e.g., the modified notification in an A/V format can be presented on a smart watch, that may be connected to the mobile device on which the camera application is being executed).

Figure 8A:
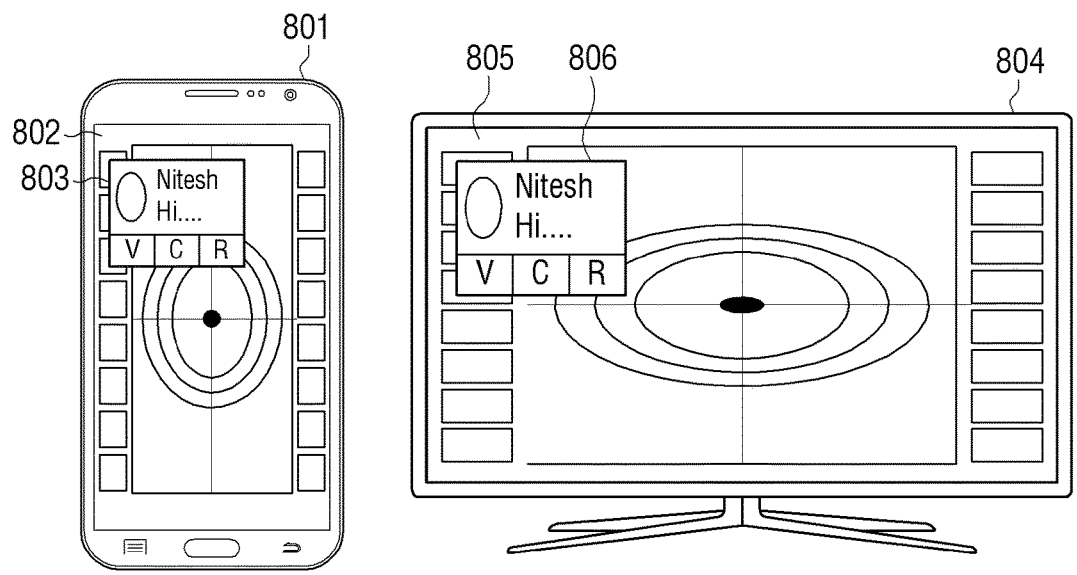
FIGS. 8A and 8B illustrate handling an SMS related notification while executing a screen sharing application according to an embodiment of present disclosure.
Figure 8B:
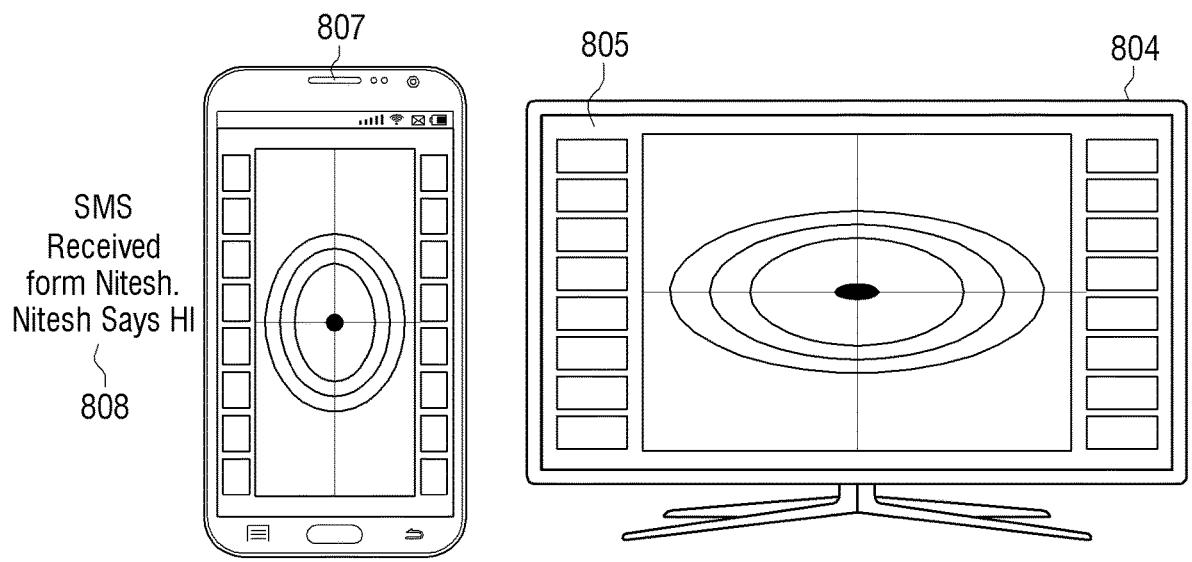

FIGS. 8A and 8B illustrate handling an SMS related notification while executing a screen sharing application according to an embodiment of the present disclosure.

Referring to FIG. 8A, a conventional scenario is illustrated as per the prior art, pertaining to a screen mirroring or a screen sharing application. There is a first electronic device having a display unit 801 rendering a graphical user interface 802 pertaining to the screen sharing application. A notification 803 pertaining to an incoming SMS is provided to display unit 801 associated with the electronic device and rendered on the graphical user interface 802.

Since the first electronic device is in screen sharing mode with a second electronic device, a display unit 804 of the second electronic device is shown as rendering a graphical user interface 805 pertaining to screen sharing application. The graphical user interface 805 rendered on the second electronic device is substantially similar to the graphical user interface 802 rendered on the first electronic device. Also, the second electronic device is illustrated as rendering a notification 806 pertaining to the incoming SMS. It may be noted that the notification 806 rendered on the second electronic device is substantially similar to the notification 803 rendered on the first electronic device.

Referring to FIG. 8B, a scenario is illustrated in accordance with an embodiment of the present disclosure. Comparing FIGS. 8A and 8B, the notification is in a text format and is rendered on both the first electronic device and the second electronic device, while the modified notification is of an only audio type. Furthermore, the modified notification only audio, is provided to an audio output unit 807 associated with the first electronic, which is in the form an audio message 808. The first electronic device may provide to the modified notification in audio format which says "SMS received from Nitesh". In addition to the above, the first electronic device may convert the text contained in the SMS into an audio format and play the same. For example, an additional audio notification can be provided which states "Nitesh says—Hi". This action may be performed, in response to user specific command, for example, a command equivalent to a viewing command.

Figure 9A:
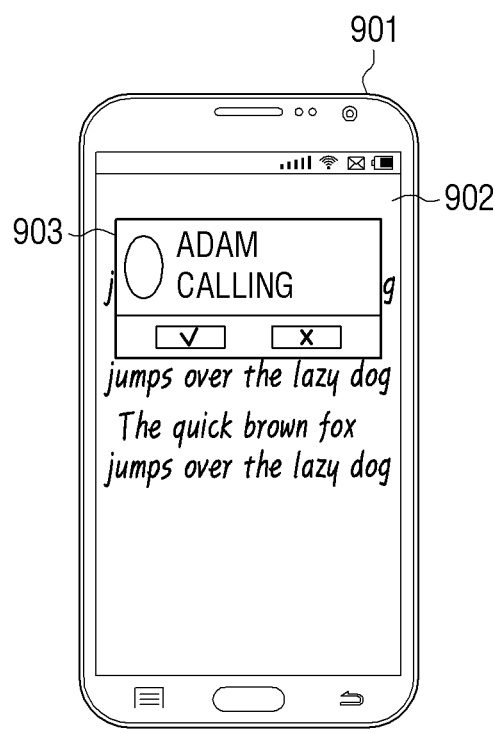
FIGS. 9A and 9B illustrate handling a call related notification while executing a document reading application according to an embodiment of present disclosure.
Figure 9B:
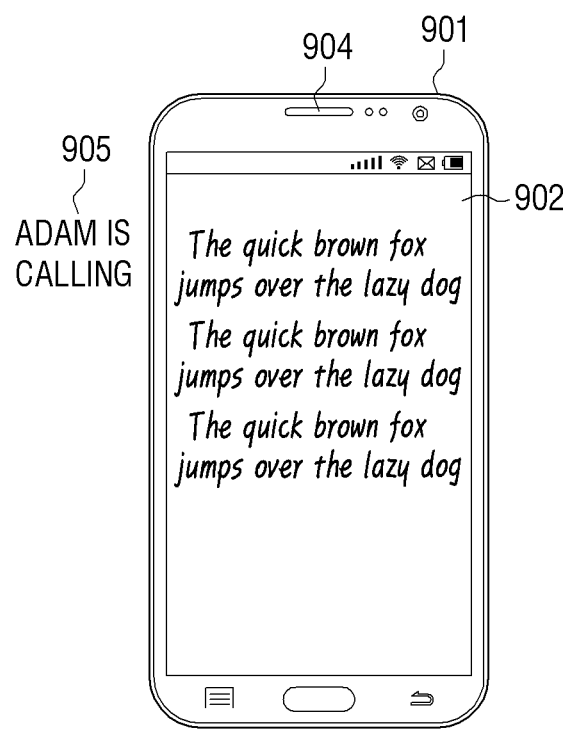

FIGS. 9A and 9B illustrate handling a call related notification while executing a document reading application according to an embodiment of the present disclosure.

Referring to FIG. 9A, a conventional scenario is illustrated as per the prior art, wherein a notification 903 pertaining to the incoming call is provided to display unit 901 associated with the electronic device and rendered on the graphical user interface 902 pertaining to a document reading application.

Referring to FIG. 9B, a scenario is illustrated in accordance with an embodiment of present disclosure. Comparing FIGS. 9A and 9B, the notification is in a text format, while the modified notification is of an only audio type. Thus, an audio output unit 904 associated with the electronic device provides the modified notification 905, which is in the form an audio message. The electronic device may provide to the modified notification in audio format which says "Nitesh is calling" to the audio output unit 904 associated with the electronic device.

In addition, the electronic device may detect a voice command from the user corresponding to the action options. For example, in response to detecting a voice command "accept" (or any other equivalent or any predefined voice command), the call can be connected. Alternatively, in response to detecting a voice command "reject" (or any other equivalent or any predefined voice command), the call can be rejected.

FIGS. 10A to 10E illustrate handling a call related notification on a wearable device according to an embodiment of the present disclosure.

Figure 10A:
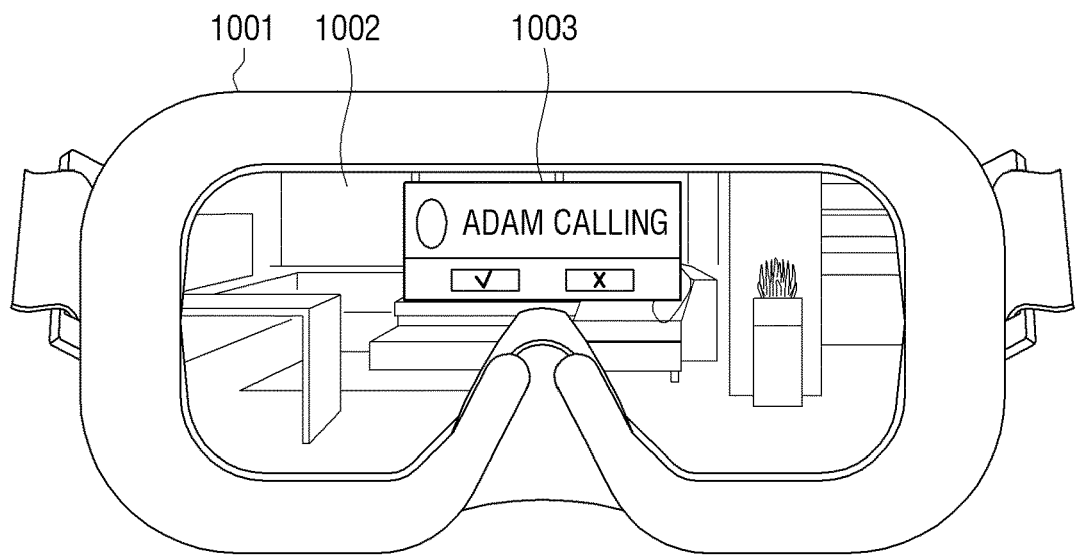
FIGS. 10A to 10E illustrate handling a call related notification on a wearable device according to an embodiment of present disclosure.

Referring to FIG. 10A, a conventional scenario is illustrated as per the prior art, wherein a notification 1003 pertaining to the incoming call is provided on a wearable device 1001, particularly, a display unit associated with a wearable device and rendered on the graphical user interface 1002 pertaining to content (e.g., virtual reality content).

Figure 10B:
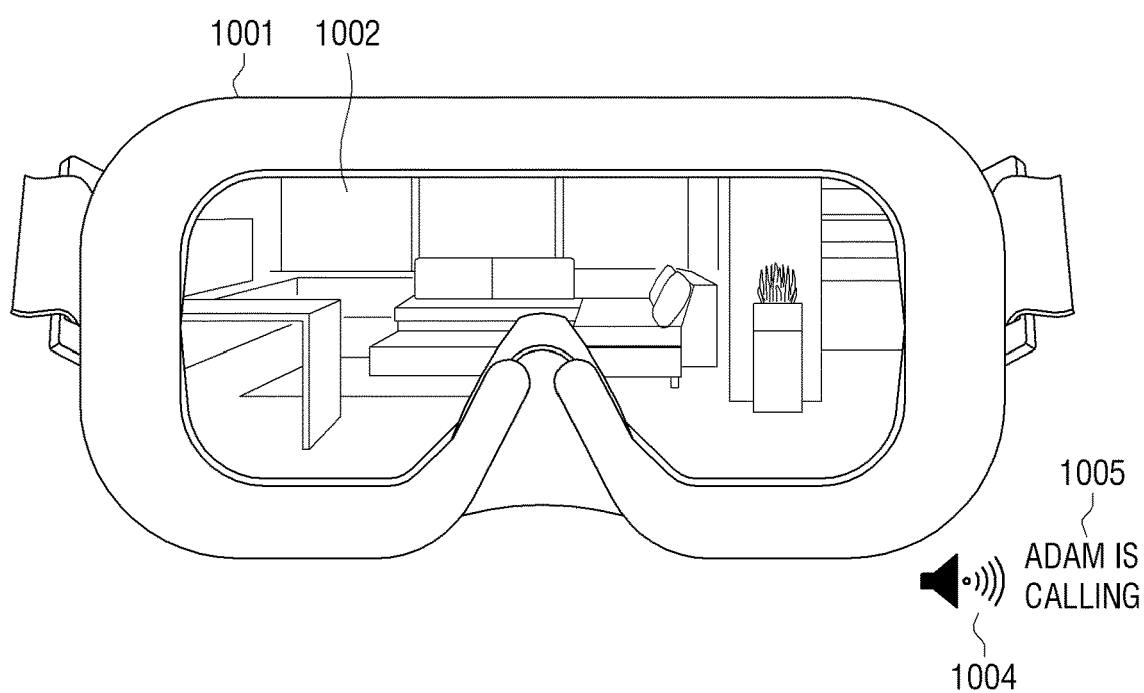

Referring to FIG. 10B, a scenario is illustrated in accordance with an embodiment of present disclosure. Comparing FIGS. 10A and 10B, it can be seen that the notification is in A/V format, while the modified notification is of an only audio type. Thus, an audio output unit 1004 associated with the wearable device or associated with the electronic device provides the modified notification 1005, which is in the form an audio message. The wearable device or the electronic device may provide to the modified notification in audio format which says "Nitesh is calling" to the audio output unit 1004 associated thereto.

Figure 10C:
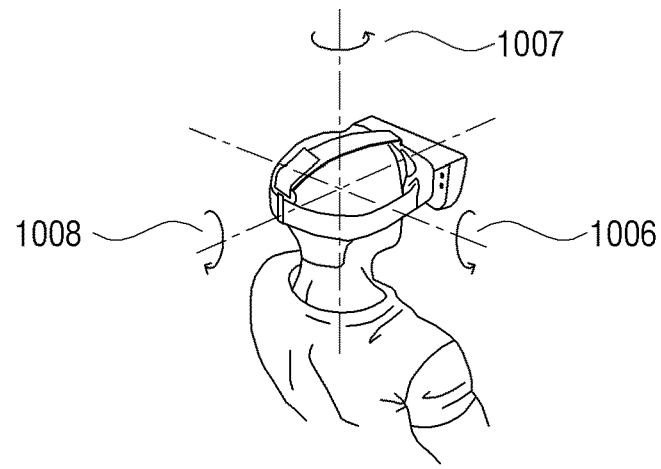
Figure 10D:
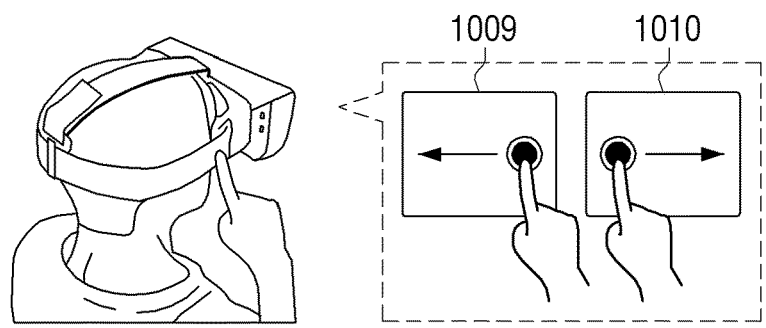
Figure 10E:
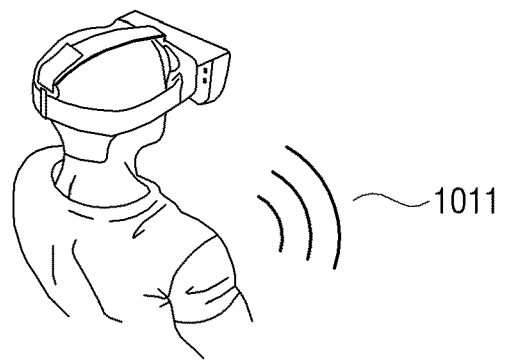

Referring to FIGS. 10C to 10E, the wearable device or the electronic device can detect a command from the user corresponding to an action option. For example, as shown in FIG. 10C, the command corresponding to an action option can be in the form of a head movement along any of the three directions 1006, 1007, or 1008. Alternatively, as illustrated in FIG. 10D, the command corresponding to the action option can be in the form of a hand/finger movement along any of the two directions 1009 or 1010. Alternatively, as shown in FIG. 10E, the command corresponding to the action option can be in the form of a voice command 1011.

Figure 11A:
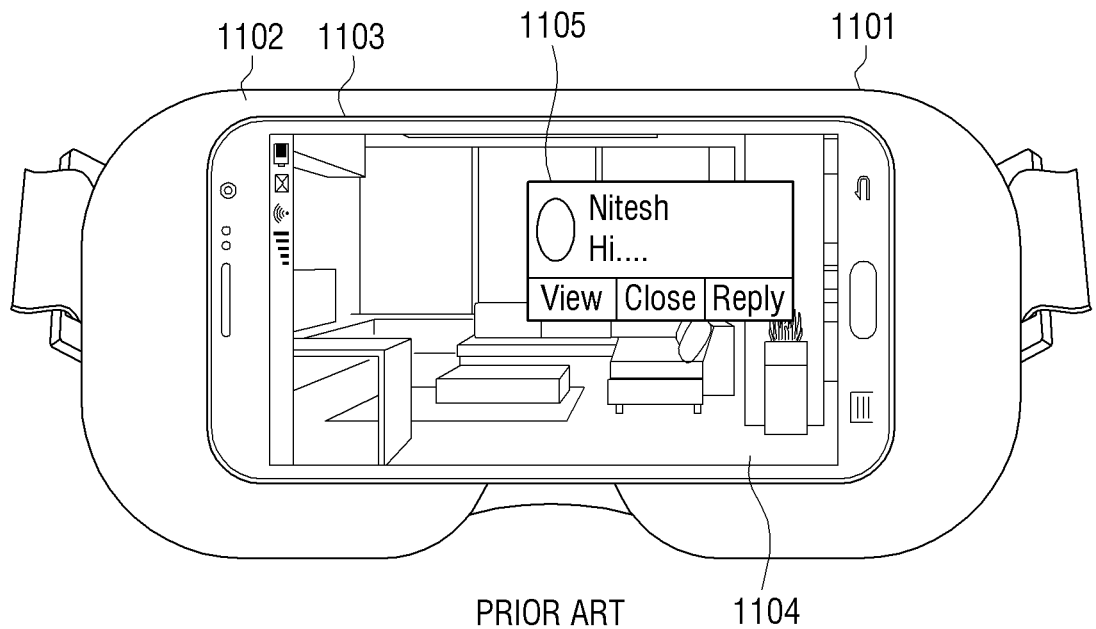
FIGS. 11A and 11B illustrate handling an SMS related notification on a virtual reality (VR) device while executing virtual reality content according to an embodiment of present disclosure.
Figure 11B:
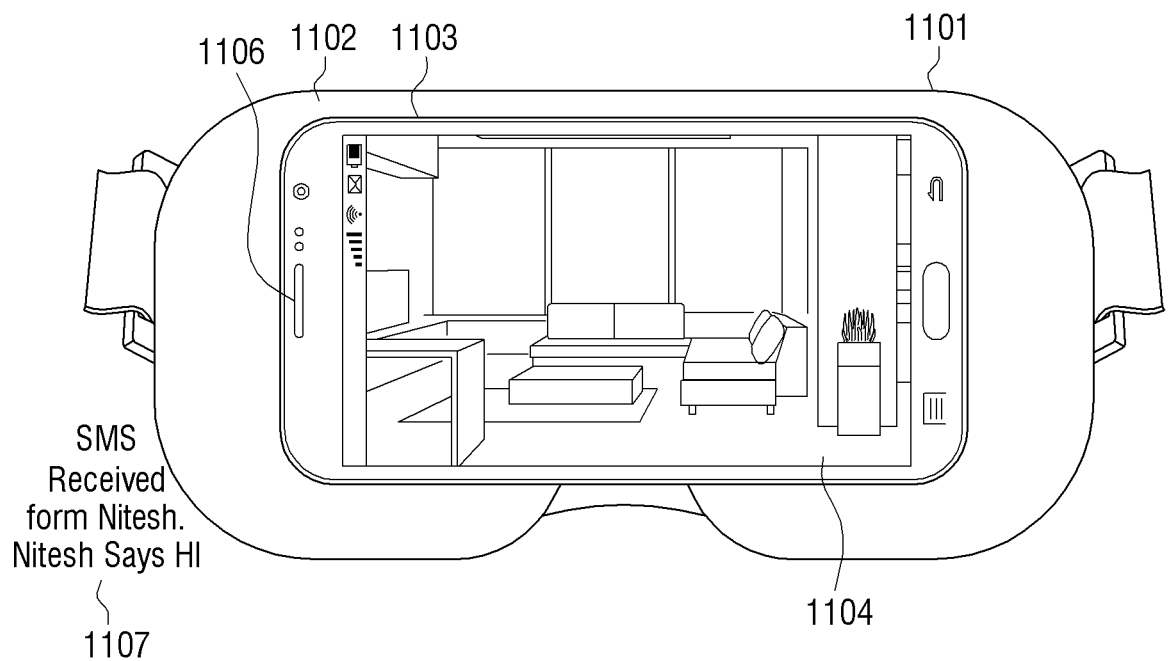

FIGS. 11A and 11B illustrate handling an SMS related notification on a VR device while executing virtual reality content according to an embodiment of the present disclosure.

Referring to FIG. 11A, a conventional scenario is illustrated as per the prior art, involving a virtual reality device 1101. The virtual reality device 1101 may comprise an HMD 1102 and a smart phone 1103 mounted within the HMD such that the smart phone faces the lens of the HMD. A display unit associated with a smart phone 1103 and renders a graphical user interface 1104 pertaining to a virtual reality content. Upon the graphical user interface 1104 pertaining to the virtual reality content, a notification 1105 pertaining to SMS is provided.

Referring to FIG. 11B, a scenario is illustrated in accordance with an embodiment of the present disclosure. Comparing FIGS. 11A and 11B, the notification is in an A/V format, while the modified notification is of an only audio type. Thus, it can be observed that an audio output unit 1106 associated with the smart phone 1103 provides the modified notification 1107, which is in the form an audio message. The smart phone 1103 may provide to the modified notification in audio format which says "SMS received from Nitesh". In addition to the above, the smart phone 1103 may convert the text contained in the SMS into an audio format and play the same. For example, an additional audio notification can be provided to say "Nitesh says—Hi". This action may be performed, in response to user specific command, for example, a command equivalent to viewing command.

Figure 12:
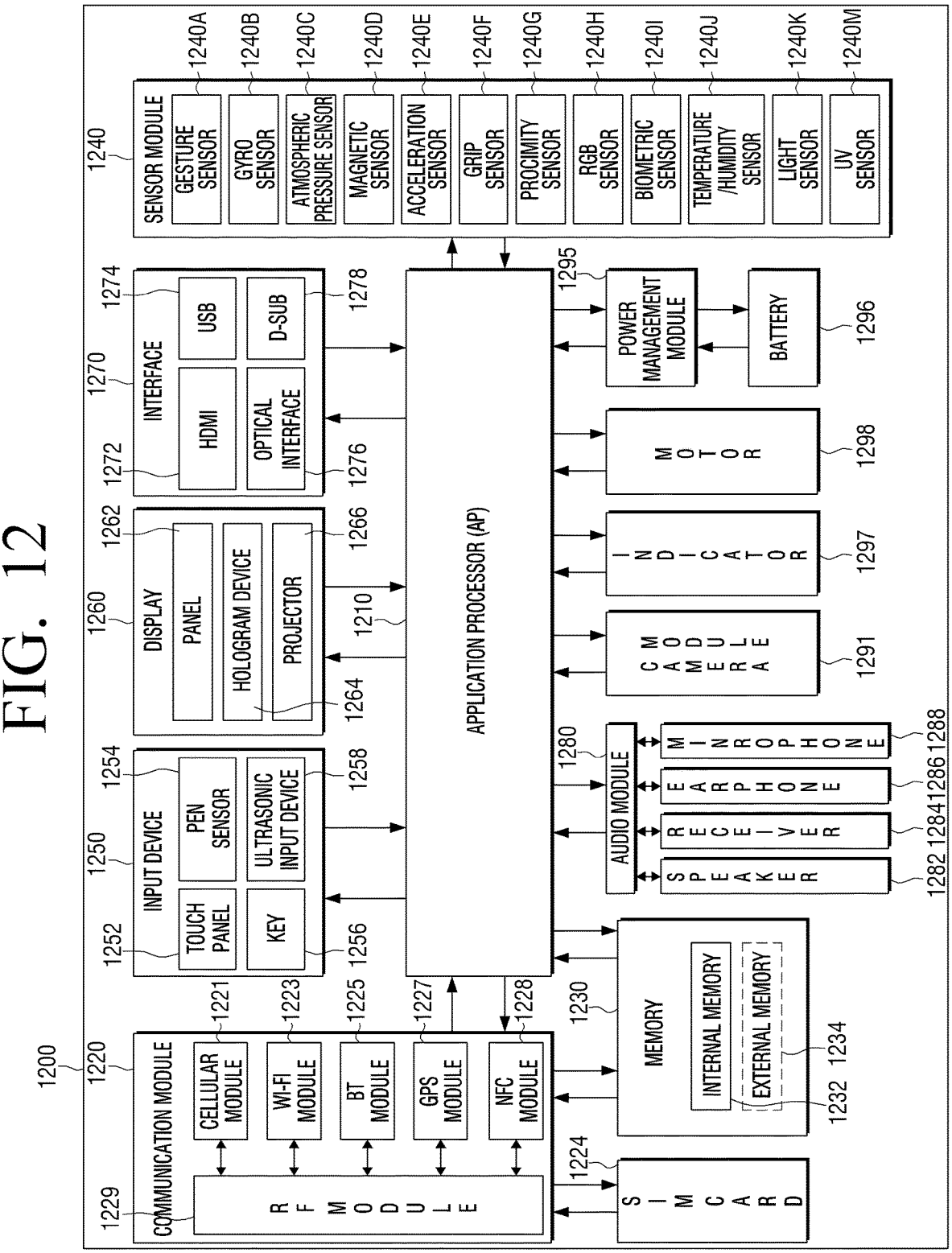
FIG. 12 is a block diagram of the electronic device according to an embodiment of present disclosure.

FIG. 12 illustrates a block diagram of an electronic device 1200 according to various embodiments of the present disclosure. The electronic device 1200 may be, for example, a whole or a part of the electronic device 101, electronic device 102, electronic device 104, and server 106.

Referring to FIG. 12, the electronic device 1200 may include one or more APs 1210, a communication module 1220, a subscriber identification module (SIM) 1224, a memory 1230, a sensor module 1240, an input device 1250, a display 1260, an interface 1270, an audio module 1280, a camera module 1291, a power management module 1295, a battery 1296, an indicator 1297, and a motor 1298.

The AP 1210 may have a configuration the same or similar to the processor 120. The AP 1210 may control one or more hardware or software components that are connected to the AP 1210 by executing an OS or an application program, and may perform processing or computation of various types of data including multimedia data. The AP 1210 may be implemented as a system on chip (SoC). According to an embodiment of the present disclosure, the AP 1210 may further include a GPU. The AP 1210 may also include at least some of the components of the notification handling module 190.

The communication module 1220 may have a configuration the same or similar to the communication interface 170. The communication module 1220 may transmit and receive data in a communication between the electronic device 1200 and other electronic devices. According to an embodiment of the present disclosure, the communication module 1220 may include a cellular module 1221, a Wi-Fi module 1223, a Bluetooth (BT) module 1225, a GPS module 1227, a near field communication (NFC) module 1228, and a RF module 1229.

The cellular module 1221 may provide services such as a voice call, a video call, an SMS, or the Internet, via a communication network (e.g., LTE, LTE-A, CDMA, WCDMA, UMTS, WiBro, or GSM). The cellular module 1221 may identify and authenticate electronic devices within a communication network, using a SIM card (e.g., the SIM 1224 card). According to an embodiment of the present disclosure, the cellular module 1221 may perform at least a part of the functionalities of the AP 1210.

According to an embodiment of the present disclosure, the cellular module 1221 may include a CP. The cellular module 1221 may be implemented as SoC. Although components such as the cellular module 1221 (e.g., the CP), the memory 1230, or the power management module 1295 are illustrated in FIG. 12 as configured separately from the AP 1210, the AP 1210 may include, or be integrated with, one or more of the foregoing components (e.g., the cellular module 1221).

According to an embodiment of the present disclosure, the AP 1210 or the cellular module 1221 (e.g., the CP) may process instructions or data received from at least one of a non-volatile memory or other components by loading the instructions or the data in a volatile memory. In addition, the AP 1210 or the cellular module 1221 may store at the non-volatile memory at least one of data received from at least one of other components or data generated by at least one of the other components.

Each of the Wi-Fi module 1223, the BT module 1225, the GPS module 1227, and the NFC module 1228 may include a processor that may process data received or transmitted by the respective modules. Although FIG. 12 illustrates the cellular module 1221, the Wi-Fi module 1223, the BT module 1225, the GPS module 1227, and the NFC module 1228 as separate components, any combination (e.g., two or more) of the cellular module 1221, the Wi-Fi module 1223, the BT module 1225, the GPS module 1227, and the NFC module 1228 may be included in an IC or an IC package according to an embodiment of the present disclosure. At least some of the processors corresponding to the respective cellular module 1221, the Wi-Fi module 1223, the BT module 1225, the GPS module 1227, or the NFC module 1228 may be implemented as a single SoC. A CP corresponding to the cellular module 1221 and a Wi-Fi processor corresponding to the Wi-Fi module 1223 may be implemented as a single SoC.

The RF module 1229 may transmit and receive data, for example, RF signals. The RF module 1229 may include a transceiver, a power amplifier module (PAM), a frequency filter, or a low noise amplifier (LNA). The RF module 1229 may further include one or more components for transmitting and receiving electro-magnetic (EM) waves in free space, such as conductors or conductive wires. Although FIG. 12 illustrates that the cellular module 1221, the Wi-Fi module 1223, the BT module 1225, the GPS module 1227, and the NFC module 1228 share the single RF module 1229, at least one of the cellular module 1221, the Wi-Fi module 1223, the BT module 1225, the GPS module 1227, or the NFC module 1228 may transmit and receive RF signals via a separate RF module according to an embodiment of present disclosure.

The SIM 1224 may be a card including a SIM, and may be configured to be inserted into a slot disposed at a specified location of the electronic device. The SIM card 1224 may include a unique identifier (e.g., integrated circuit card identifier (ICCID)) or subscriber information (e.g., international mobile subscriber identity (IMSI)).

The memory 1230 may include an internal memory 1232 or an external memory 1234. The internal memory 1232 may be a volatile memory (e.g., dynamic RAM (DRAM), static RAM (SRAM), or synchronous dynamic RAM (SDRAM)) or a non-volatile memory (e.g., one time programmable ROM (OTPROM), programmable ROM (PROM), erasable and programmable ROM (EPROM), electrically erasable and programmable ROM (EEPROM), mask ROM, flash ROM, NAND flash memory, or NOR flash memory).

According to an embodiment of the present disclosure, the internal memory 1232 may be a solid state drive (SSD). The external memory 1234 may be a flash drive (e.g., a compact flash (CF) drive, a secure digital (SD), a micro secure digital (micro-SD), a mini secure digital (mini-SD), an extreme digital (xD), or a memory stick). The external memory 1234 may be operatively coupled to the electronic device 1200 via various interfaces. The electronic device 1200 may further include recording devices (or recording media) such as a hard disk drive (HDD).

According to an embodiment of the present disclosure, the internal memory 1232 may have a configuration the same or similar to the memory 130. The internal memory 1232 may have a configuration the same or similar to the database 206. The external memory 1234 may have a configuration the same or similar to the database 206.

The sensor module 1240 may measure physical properties or detect operational states associated with the electronic device 1200, and convert the measured or detected information into electric signals. The sensor module 1240 may include a gesture sensor 1240A, a gyro sensor 1240B, an atmospheric pressure sensor 1240C, a magnetic sensor 1240D, an accelerometer sensor 1240E, a grip sensor 1240F, a proximity sensor 1240G, a color sensor 1240H (e.g., a red, green, blue (RGB) sensor), a biometric sensor 1240I, a temperature/humidity sensor 1240J, an illuminance sensor 1240K, or an ultra violet (UV) sensor 1240M. Additionally or alternatively, the sensor module 1240 may include an electrical-nose sensor, an EMG sensor, an EEG sensor, an IR sensor, an iris sensor, or a finger print sensor. The sensor module 1240 may further include a control circuit for controlling one or more sensors included therein.

The input device 1250 may include a touch panel 1252, a (digital) pen sensor 1254, a key 1256, or an ultrasonic input device 1258. The touch panel 1252 may detect a touch input using a capacitive, a resistive, an infrared, and an ultrasonic methods. The touch panel 1252 may further include a control circuit. A capacitive-type touch panel may detect physical touch inputs or proximity inputs. The touch panel 1252 may further include a tactile layer, which may provide haptic feedback to the user.

The (digital) pen sensor 1254 may be implemented using methods the same to or similar to receiving a touch input from a user, or using a separate detection sheet. The key 1256 may include a physical button, an optical key, or a keypad. The ultrasonic input device 1258 may be a device configured to identify data by detecting, using a microphone 1288, ultrasonic signals generated by a device capable of generating the ultrasonic signal. The ultrasonic input device 1258 may detect data wirelessly. According to an embodiment of the present disclosure, the electronic device 1200 may receive a user input from an external device (e.g., a computer or a server) connected to the electronic device 1200 using the communication module 1220.

The display module 1260 may include a panel 1262, a hologram device 1264, or a projector 1266. The panel 1262 may be a LCD or an active-matrix organic light-emitting diode (AM-OLED) display. The panel 1262 may be configured to be flexible, transparent, or wearable. The panel 1262 and the touch panel 1252 may be implemented as a single module. The hologram device 1264 may utilize the interference of light waves to provide a three-dimensional image in empty space. The projector 1266 may provide an image by projecting light on a display. The display may be positioned inside or outside the electronic device 1200. According to an embodiment of the present disclosure, the display module 1260 may further include a control circuit for controlling the panel 1262, the hologram device 1264, or the projector 1266. The display module 1260 may further have a configuration the same or similar to the output unit 160.

The interface 1270 may include a HDMI 1272, a USB 1274, an optical interface 1276, or a D-subminiature (D-sub) 1278. Additionally or alternatively, the interface 1270 may include a mobile high-definition link (MHL) interface, an SD/MultiMedia Card, or an IrDA interface. The interface 1270 may be incorporated into the communication interface 170.

The audio module 1280 may encode/decode a voice into an electrical signal, and vice versa. At least a part of components of the audio module 1280 may be incorporated in the output unit 160. The audio module 1280 may process audio information input into, or output from a speaker 1282, a receiver 1284, an earphone 1286, or the microphone 1288.

The camera module 1291 may capture still images or a video. According to an embodiment of the present disclosure, the camera module 1291 may include one or more image sensors (e.g., a front sensor or a rear sensor), a lens, an ISP, or a flash (e.g., a LED or a Xenon lamp).

The power management module 1295 may manage power of the electronic device 1200. The power management module 1295 may include a power management IC (PMIC), a charger IC, or a battery gauge.

The PMIC may be disposed in an IC or a SoC semiconductor. The charging method for the electronic device 1200 may include wired or wireless charging. The charger IC may charge a battery, or prevent excessive voltage or excessive current from a charger from entering the electronic device 1200. According to an embodiment of the present disclosure, the charger IC may include a wired charger IC or a wireless charger IC. The wireless charger IC may be a magnetic resonance type, a magnetic induction type, or an electromagnetic wave type, and may include additional circuits for wireless charging, such as a coil loop, a resonance circuit, or a rectifier.

The battery gauge may measure a charge level, a voltage while charging, current, or temperature of the battery 1296. The battery 1296 may store or generate electricity and supply power to the electronic device 1200 using the stored or generated electricity. The battery 1296 may include a rechargeable battery or a solar battery.

The indicator 1297 may indicate one or more states (e.g., boot status, message status, or charge status) of the electronic device 1200 or a part of the electronic device 1200 (e.g., the AP 1210). The motor 1298 may convert an electrical signal into a mechanical vibration. The electronic device 1200 may include a device for supporting mobile TV (e.g., a GPU). The device for supporting mobile TV may process media data compliant with digital multimedia broadcasting (DMB), digital video broadcasting (DVB), or Media Flow™.

According to various embodiments of the present disclosure, the notification handling module 190 may mean a software module for performing the operations of embodiments, and may be implemented as hardware (e.g., a processor) that executes such software. In the case of a software module, the notification handling module 190 may be implemented as a recording medium which program codes for performing notification handling operations are stored therein.

Figure 13:
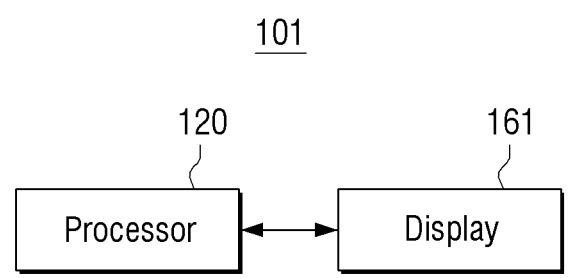
FIG. 13 is a block diagram of the electronic device according to an embodiment of present disclosure.

FIG. 13 illustrates a configuration of the electronic device according to an embodiment of the present disclosure. Referring to FIG. 13, the electronic device 101 includes the processor 120 and the display 161.

The processor 120 is a component for controlling the overall operation of electronic device 101. Specifically, if a plurality of applications are installed in the electronic device 101, the processor 120 may execute each application according to the user's selection. The applications may be stored in the internal memory of the processor 120 or separately provided memory (e.g., memory 130) or storage, or external memory connected to the electronic device 101, etc. Priorities can be set for each application.

The processor 120, when an application is executed, controls the display 161 to display the execution screen.

When the notification of another application is generated while the application is being executed, the processor 120 provides notification in a different manner according to the priority of the two applications. The notification of the application may be a new message broadcast by the server providing the application. If the message is a messenger program or a message program, the new message sent by the other party is also included in the notification. A user may set a priority for each application by using an application management program of the electronic device 101, or a default order may be automatically set if there is no other setting. For example, the notification generated in the OS or middleware of the electronic device 101 itself may be ranked first, the notification generated in the messenger, message, or a mail program may be ranked second, and the notification generated in an application such as a game may be ranked third, etc.

The processor 120 may compare priorities of applications and determine a method for providing a notification of an application to be executed later. Here, the electronic device 101 may be a head mounted display (HMD) and the execution screen of the application may comprise an augmented reality (AR) image or a virtual reality (VR) image.

The processor 120 may display the notification message or provide the notification when the application is executed in an AR mode or a VR mode.

Specifically, the processor 120 displays a notification message on the execution screen when a notification of an application having a higher priority than an application which is being executed is generated. Meanwhile, if a notification of an application having a lower priority than an operating application occurs, a notice is given so as not to block the execution screen.

In order to provide a notification so as not to block the execution screen, the processor 120 may change various ways of providing the notification message. For example, the notification providing method may be any one of a visual notification providing method, an acoustic notification providing method, and a visual notification providing method after a currently executed application is terminated. The processor 120 may compare the priorities and change the notification method to any one of the three types of notification providing methods described above. For example, it is assumed that the notification method is basically a visual notification method. In this case, if a notification of an application having a lower priority than that of an operating application is generated, it can be changed to an audio notification providing method so as not to block the execution screen in the conventional visual notification providing method.

As illustrated in FIG. 1, if a speaker is further included, when a notification of an application having a lower priority than an application which is being executed is generated, the processor 120 may control a speaker and output a notification sound without displaying a notification message on an execution screen.

In this case, the notification sound may include a speech voice message which speaks a text included in the notification.

In addition, the output volume of the notification sound can be set differently according to the priority. Specifically, it is possible to compare the priorities of the applications currently operating with the applications that provide notification, and to set different output of the notification sound according to the different priorities. For example, when a notification of an application having a lower priority than that of an operating application occurs, the output of the notification sound can be set smaller as the difference in priority becomes greater.

In case when a microphone is further included, if the user's voice corresponding to the notification sound is input through the microphone, the processor 120 may use the user's voice as an input to the application that provided the notification. For example, when a new message arrival notification is received, if the user speaks a response to the message, the user may recognize the response to the message, convert the message into a text, and transmit a response message including the text to the new message transmission address.

Alternatively, the processor 120, when a notification of an application having a lower priority than an application which is being executed is generated, may control a display to display a notification message after the executing application is terminated.

In the aforementioned embodiment of present disclosure, it is described that priorities are set by applications, but within a same application, priorities can be set differently by types of notifications.

Specifically, the type of notification of a specific application may be plural. For example, it may be assumed that an application is an application for purchasing goods. Applications that can purchase goods can provide advertisement notifications, billing notifications, delivery notifications, inquiry notifications, information change notifications, etc. In this case, priority can be assigned to a specific application itself, and priority can be determined for each type of alarm. The user can control the electronic device 101 to change the notification providing mode only in a specific alarm type by setting priorities differently according to the type of the alarm. For example, if the user has set the lowest priority for a specific application, but has set the highest priority for the delivery notification, the electronic device 101 may control the processor 120 to immediately apply the visual notification providing method when a delivery notification of a specific application is received. In this case, the predetermined priority corresponding to the specific application can be ignored.

In addition, if a specific word is included in the notification of the specific application, the processor 120 can set the priority of the notification to the highest priority or the lowest priority according to the content of the specific word. For example, it may be assumed that the specific application is a character transmission application. In this case, if the received character includes any one of emergency, must read, disaster, earthquake, emergency, etc., the processor 120 can determine that the notification has the highest priority. In this case, whatever the operating application is, the notification can be displayed on the screen. On the other hand, when the received characters include advertisement, sale, loan, etc., the processor 120 can set the lowest priority for the notification. In this case, even if the priority of the character transmission application is higher than that of the currently executed application, the notification is not provided in the form of a visual message.

So far, an operation to change a notification providing method is described such that, the notification providing method is changed to one of the visual notification providing method, sound notification providing method, and visual notification providing method after terminating of the currently-executed application However, the notification providing method can be implemented by changing the details in the same notification providing method. Specifically, changing the notification providing method may be configured to change at least one of the size, position, shape, color, and transparency of the UI in the visual notification providing method. For example, when a notification of an application having a lower priority than that of an operating application occurs, a visual notification with a smaller size may be provided as the priority difference becomes greater.

Figure 14:
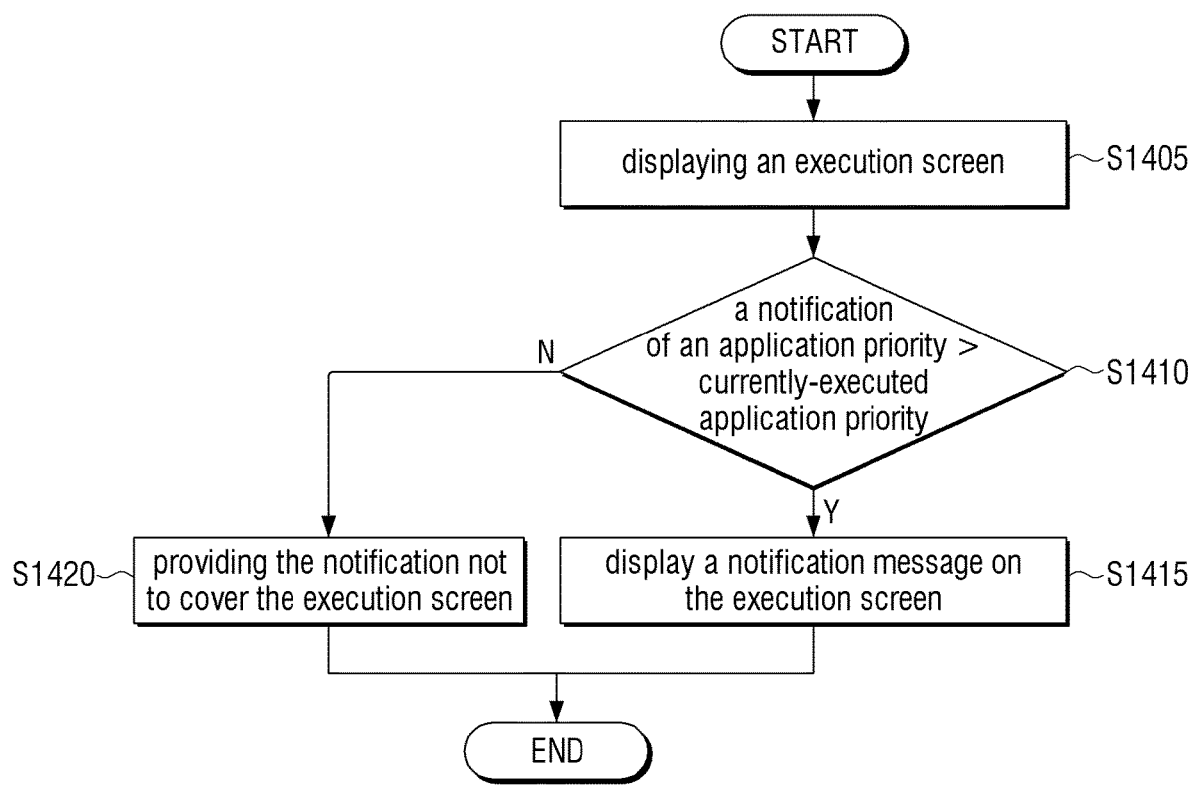
FIG. 14 is a flowchart illustrating a method for providing a notification of the electronic device according to an embodiment of present disclosure.

FIG. 14 is a flowchart illustrating a method for providing a notification of the electronic device, according to an embodiment of the present disclosure.

Referring to FIG. 14, in step 1405, when one of the applications installed in the electronic device 101 is executed, the electronic device 101 displays the execution screen. The priority can be individually set for each application. In step 1410, when the notification of another application occurs, the electronic device 101 can compare the priority of the application and determine the notification providing method.

When a notification of an application having a higher priority than that of a running application occurs, in step 1415, a notification message is displayed on the execution screen. When an application having a lower priority than an executing application is notified, in step 1420, a notification provided not to block the execution screen.

The displaying the notification message or the providing the notification is performed when the application is executed in an AR mode or a VR mode.

If the notification providing method is set to the sound output method, the electronic device 101 can output the notification sound through the speaker without displaying a separate notification message on the execution screen. According to various embodiments of the present disclosure, the text included in the notification may be output in the form of a speech voice message to be ignited, and the output volume of the notification sound may be set differently according to the priority.

In addition, a notification of an application having a lower priority than a currently-executed application is generated, a notification message can be displayed after currently-executed application is terminated.

If a specific word is included in the notification of a specific application, setting the priority of the notification to the highest priority or the lowest priority according to the contents of the specific word may be further included. This has been described in the above-mentioned section, and redundant description will be omitted.

According to various embodiments of the present disclosure, the notification of the application in the prior order or subsequent order than the application which is currently executed occurs. However, notification of the application of the same priority may occur. In this case, it can be handled in the same manner as the prior order application or can be handled in the same manner as the subsequent order application according to the embodiment.

In addition, the electronic device according to an embodiment of the present disclosure provides a visual notification if it is prior to the priority of the currently operating application, provides sound output notification if it is in the same order as the currently operating application. In case of a lower ranking, a visual notification may be provided after the currently operating application is terminated.

Each of components of an electronic device described above according to various embodiments of the present disclosure may include one or more components, and each component's name may vary according to the type of the electronic device. The electronic device may include at least one of the above-described components, and some may be omitted or additional components may be included. In addition, some of the components of the hardware may be combined into a single component and perform functions identical to those of the respective components before their combination. Similarly, some of the components of the hardware may be split into a plurality of entities that collectively perform functions identical to those of the respective component before their split.

According to various embodiments of the present disclosure, at least a part of devices (e.g., modules or their functions) or methods (e.g., operations) may be implemented in the form of a programming module, as commands stored in a non-transitory computer-readable storage medium. When a command is executed by one or more processors (e.g., the processor 120), the one or more processors may execute a function corresponding to the command. The non-transitory computer-readable storage medium may be the memory 130. At least a part of the programming module may be implemented (e.g., executed) by the processor 120. At least a part of the programming module may include, for example, a module, a program, a routine, a set of instructions, and/or a process to execute one or more functions.

The non-transitory computer-readable recording medium may include any kind of hardware device configured specially to store a program command (e.g., a programming module). Examples of the hardware device may include magnetic media such as a hard disk, floppy disk, and a magnetic tape, optical media such as a CD-ROM and a DVD, magneto-optical media such as an optical disk, a ROM, a RAM, a flash memory, etc. The program command may include code that can be executed in a computer using an interpreter as well as assembly code produced by a compiler. The above-mentioned hardware device may be implemented as one or more software modules to perform the operations of the present disclosure and vice versa.

Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure as defined in the appended claims and their equivalents.

What is claimed is:

1. An electronic device, comprising:
   a display;
   a speaker; and
   a processor configured to:
      detect execution of a currently executed application among a plurality of applications to which different priorities are set;
      control displaying, by the display, a screen, in response to detecting execution of the currently executed application;
      receive a notification including text content;
      identify a priority of the received notification of an application;
      compare the priority of the notification of the application to a priority of the currently executed application on the screen;
      in response to the priority of the notification of the application being higher than or equal to the priority of the currently executed application, control displaying a first notification message containing the text content included in the notification with a transparency on the screen;
      in response to the priority of the notification of the application being lower than the priority of the currently executed application, convert the text content included in the notification into an audio format based on at least part of the notification and output a second notification message speaking the text content included in the notification with the text content being displayed with a transparency having a level of transparency that is different than a level of transparency of the first notification message; and
      start a timer for accepting a user input with respect to the application which provides the displayed first or second notification messages.

2. The electronic device of claim 1, wherein an output volume of the second notification message is based on one of the priority of the notification to the priority of the currently executed application.

3. The electronic device of claim 1, wherein the processor is further configured to recognize a voice as the input with respect to an application which provides the notification, in response to the voice corresponding to a notification sound being input through the microphone.

4. The electronic device of claim 1, wherein the processor is further configured to control the display to display the text content after termination of the currently executed application, in response to the priority of the notification of the application being lower than the priority of the currently executed application.

5. The electronic device of claim 1, wherein the processor is further configured to set priorities of each notification type differently, in response to the notification of a specific application being at least one type of a plurality of types.

6. The electronic device of claim 5, wherein the processor is further configured to set a priority of the notification of the application to one of a lowest priority or a highest priority, in response to a specific word being included in the notification of the specific application.

7. The electronic device of claim 1, wherein the electronic device is a head mounted display (HMD), and the screen displays one of an augmented reality (AR) image or a virtual reality (VR) image.

8. The electronic device of claim 7, wherein the processor is further configured to display the text content when the application is executed in one of an AR mode or a VR mode.

9. A method of controlling a display of an electronic device, the method comprising:
   detecting execution of a currently executed application among a plurality of applications to which different priorities are set;

displaying a screen, in response to detecting execution of the currently executed application;

receiving a notification including text content;

identifying a priority of the notification of an application;

comparing the priority of the notification of the application to a priority of the currently executed application;

in response to the priority of the notification of the application being higher than or equal to the priority of the currently executed application, displaying a first notification message containing the text content included in the notification with a transparency on the screen;

in response to the priority of the notification of the application being lower than the priority of the currently executed application, converting the text content included in the notification into an audio format based on at least part of the notification and outputting a second notification speaking the text content included in the notification text content being displayed on the screen with a transparency having a level of transparency that is different than a level of transparency of the first notification message; and starting a timer for accepting a user input with respect to the application which provides the displayed first or second notification messages.

10. The method of claim 9, wherein an output volume of the second notification message is set differently according to priority.

11. The method of claim 9, wherein the text content is displayed after the currently executed application is terminated, in response to the notification of the application having the priority lower than the priority of the currently executed application.

12. The method of claim 9, further comprising setting priorities of each notification type differently, in response to the notification of a specific application being at least one type of a plurality of types.

13. The method of claim 12, further comprising setting the priority of the notification of the application to a lowest or highest priority, in response to a specific word being included in the notification of the specific application.

14. The method of claim 9, wherein the displaying the text content or the providing the notification is performed when the application is executed in an AR mode or a VR mode.

* * * * *